US012696198B2

(12) United States Patent
Li et al.

(10) Patent No.: US 12,696,198 B2
(45) Date of Patent: Jul. 28, 2026

(54) METHOD FOR CONFIGURING RESOURCE FOR UPLINK CONTROL CHANNEL, NETWORK SIDE DEVICE, AND STORAGE MEDIUM

(71) Applicant: DATANG MOBILE COMMUNICATIONS EQUIPMENT CO., LTD., Beijing (CN)

(72) Inventors: Xiaojiao Li, Beijing (CN); Junwei Wang, Beijing (CN); Xuejuan Gao, Beijing (CN); Lei Zhou, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 386 days.

(21) Appl. No.: 18/551,447

(22) PCT Filed: Mar. 7, 2022

(86) PCT No.: PCT/CN2022/079612
§ 371 (c)(1),
(2) Date: Sep. 20, 2023

(87) PCT Pub. No.: WO2022/206298
PCT Pub. Date: Oct. 6, 2022

(65) Prior Publication Data
US 2024/0179637 A1 May 30, 2024

(30) Foreign Application Priority Data
Apr. 2, 2021 (CN) .......................... 202110362184.6

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC ............. H04W 52/146; H04W 52/367; H04W 72/0453; H04W 72/0473; H04W 52/325; H04L 5/0053
See application file for complete search history.

(56) References Cited

U.S. PATENT DOCUMENTS

2020/0259625 A1 8/2020 Papasakellariou
2021/0014020 A1* 1/2021 Bhattad ................. H04W 72/21
(Continued)

FOREIGN PATENT DOCUMENTS

CN 103188814 A 7/2013
CN 105101377 A 11/2015
(Continued)

OTHER PUBLICATIONS

Nokia et al: "Enhancements for PUCCH formats", 3GPP Draft; R1 2100259, 3rd Generation Partnership Project (3GPP), vol. RAM WPQ, No. e-Meeting; Jan. 25, 2021-Feb. 5, 2021 Jan. 18, 2021 (Jan. 18, 2021), XP051970881. (Year: 2021).*
(Continued)

*Primary Examiner* — John J Lee
(74) *Attorney, Agent, or Firm* — Harness, Dickey & Pierce, P.L.C.

(57) ABSTRACT

The present application provides a resource configuration method for an uplink control channel PUCCH, a device, and a storage medium. The method is applied to a network side device, and the specific implementation solution is as follows: determining a transmission power required by the uplink control channel PUCCH, and according to the transmission power required by the PUCCH and maximum transmission power limit information of resource blocks, determining the number of physical resource blocks (PRBs) occupied by the PUCCH in the frequency domain, or, in response to the received PRB information sent a user equipment (UE), determining, according to the PRB infor-
(Continued)

mation, the number of PRBs occupied by the PUCCH in the frequency domain; and, configuring a transmission resource position of the PUCCH for the UE according to the number of PRBs occupied by the PUCCH in the frequency domain.

18 Claims, 3 Drawing Sheets

(56) References Cited

U.S. PATENT DOCUMENTS

| | | | | |
|---|---|---|---|---|
| 2022/0225387 | A1* | 7/2022 | Wang | H04L 5/0007 |
| 2024/0163894 | A1* | 5/2024 | Xiong | H04L 1/1854 |

FOREIGN PATENT DOCUMENTS

| | | |
|---|---|---|
| CN | 110034903 A | 7/2019 |
| CN | 110178416 A | 8/2019 |
| CN | 111010739 A | 4/2020 |
| CN | 112118072 A | 12/2020 |
| JP | 6446157 B1 | 12/2018 |
| WO | WO-2020/060089 A1 | 3/2020 |
| WO | 2022154551 A1 | 7/2022 |

OTHER PUBLICATIONS

Huawei, "Summary for AI 7.1.3.2.2. PUCCH structure in long-duration," 3GPP TSG RAN WG1 Meeting #92, R1-1803389, Feb. 26, 2018.

The Second Office Action issued Jul. 2, 2025 for Chinese Application No. 202110362184.6.

International Search Report and Written Opinion issued May 30, 2022 in International Application No. PCT/CN2022/079612.

CATT, "Enhancements for PUCCH formats for up to 71GHz operation" 3GPP TSG RAN WG1 Meeting # 104b-e, R1-2102623, Apr. 7, 2021.

ZTE, "Discussion on the PUCCH enhancements for 52.6 to 71 GHz" 3GPP TSG RAN WG1 #105-e, R1-2104834, May 12, 2021.

Search Report issued on Aug. 12, 2024 for European Application No. 22778482.4.

Qualcomm Incorporated, "Enhancement for PUCCH format 0/1for NR operations in60GHz unlicensed band," 3GPP TSG-RAN WG1 #104-e, R1-2101455, Jan. 19, 2021.

Nokia et al., "Enhancements for PUCCH formats, "3GPP TSG RAN WG1 #104-e, R1-2100259, Jan. 18, 2021.

Moderator (Ericsson), "FL Summary 2 for Enhancements for PUCCH formats 0/1/4," 3GPP TSG-RAN WG1 Meeting #104-e, R1-2101916, Jan. 25, 2021.

First Office Action issued Mar. 28, 2025 in Chinese application 2021103621846.

* cited by examiner

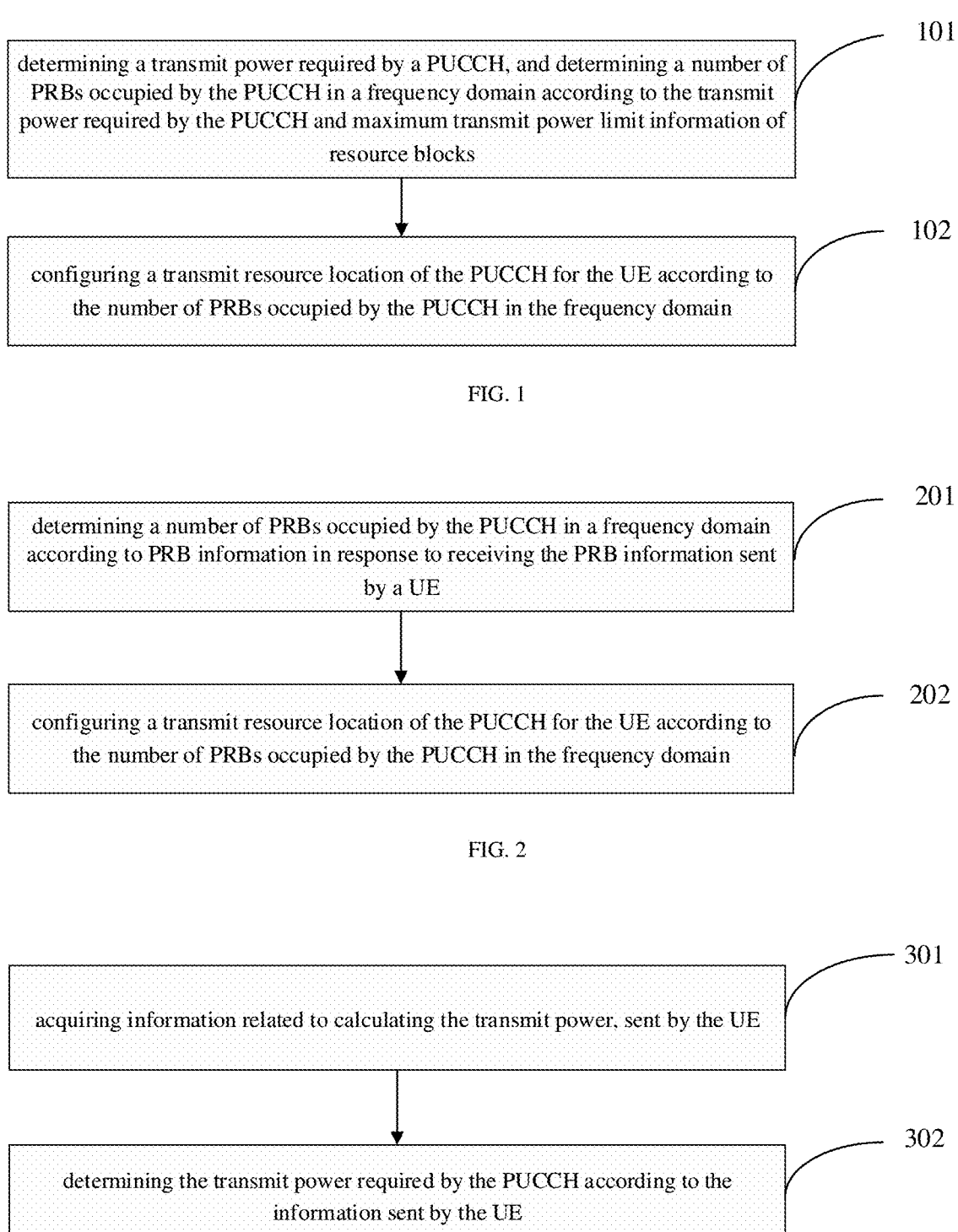

determining a transmit power required by a PUCCH, and determining a number of PRBs occupied by the PUCCH in a frequency domain according to the transmit power required by the PUCCH and maximum transmit power limit information of resource blocks

101 configuring a transmit resource location of the PUCCH for the UE according to the number of PRBs occupied by the PUCCH in the frequency domain

102

FIG. 1 determining a number of PRBs occupied by the PUCCH in a frequency domain according to PRB information in response to receiving the PRB information sent by a UE

201 configuring a transmit resource location of the PUCCH for the UE according to the number of PRBs occupied by the PUCCH in the frequency domain

202

FIG. 2 acquiring information related to calculating the transmit power, sent by the UE

301 determining the transmit power required by the PUCCH according to the information sent by the UE

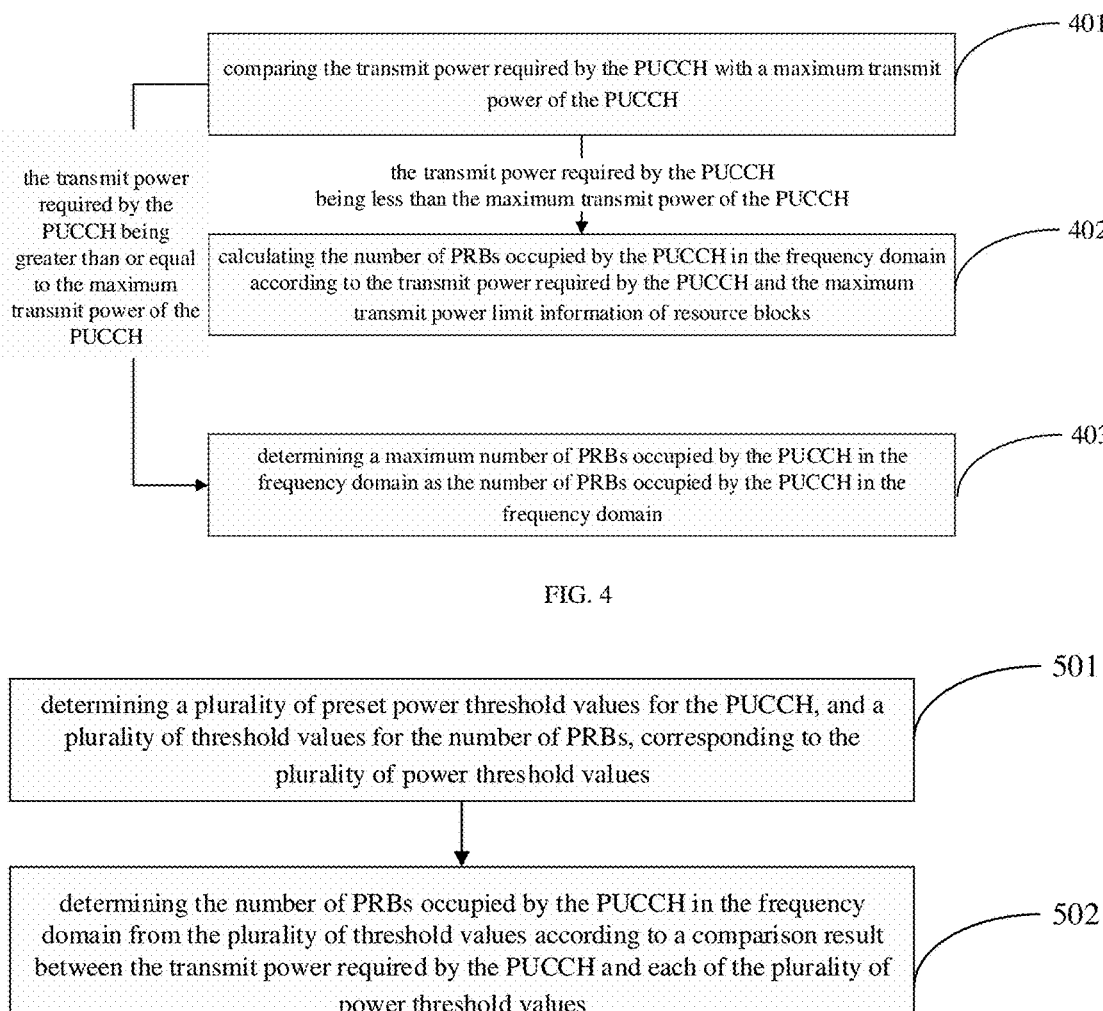
FIG. 4
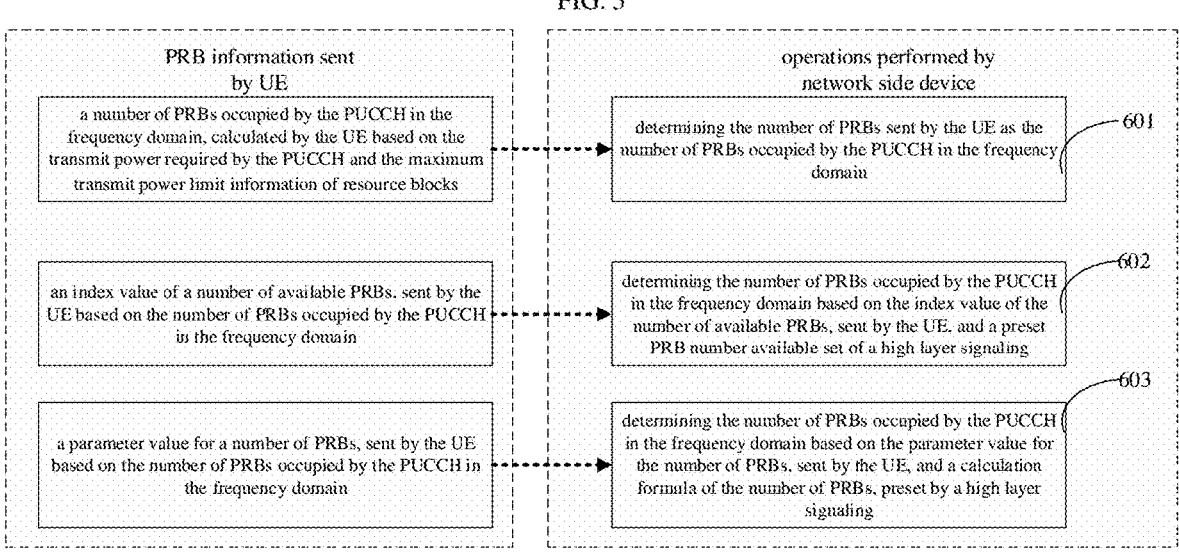
FIG. 5
FIG. 6

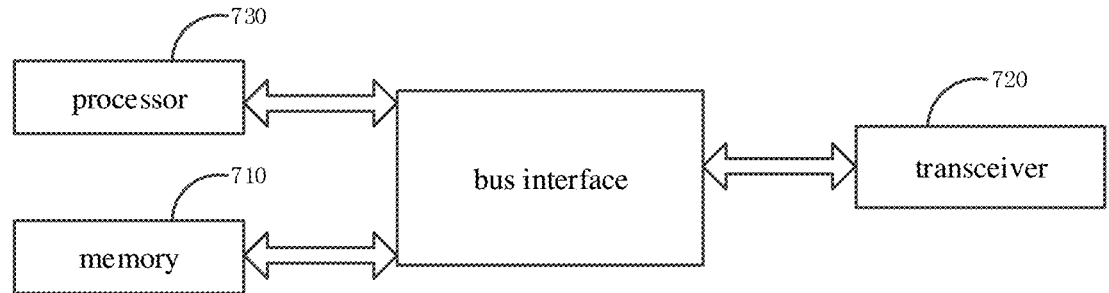
FIG. 7
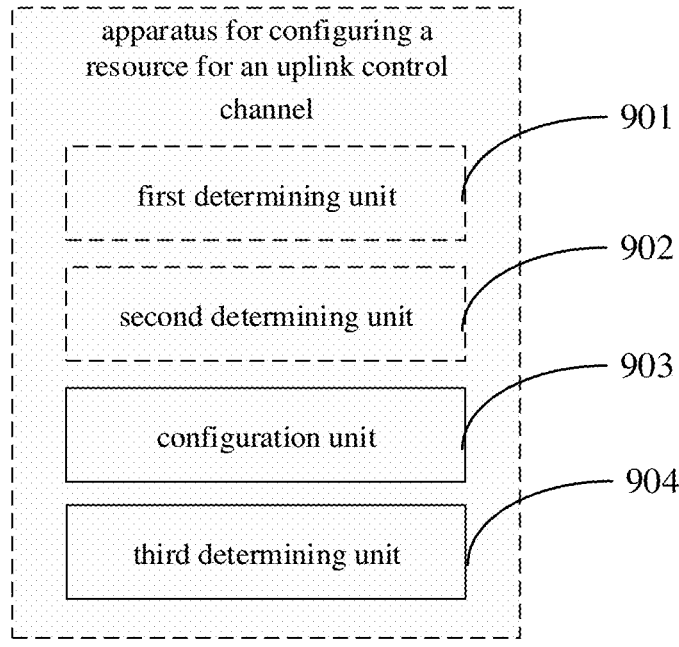
apparatus for configuring a resource for an uplink control channel
first determining unit — 801
first determining unit — 802
configuration unit — 803
FIG. 8
apparatus for configuring a resource for an uplink control channel
first determining unit — 901
second determining unit — 902
configuration unit — 903
third determining unit — 904
FIG. 9

1

METHOD FOR CONFIGURING RESOURCE FOR UPLINK CONTROL CHANNEL, NETWORK SIDE DEVICE, AND STORAGE MEDIUM

CROSS-REFERENCE TO RELATED APPLICATIONS

This application a national phase of International Application No. PCT/CN2022/079612, filed on Mar. 7, 2022, which is based on and claims priority to Chinese Patent Application No. 202110362184.6, filed on Apr. 2, 2021, the entire content of which is incorporated herein by reference.

TECHNICAL FIELD

The disclosure relates to the field of communication technologies, and more particularly, to a method for configuring a resource for an uplink control channel, a network side device, and a storage medium.

BACKGROUND

Format 0/1/4 of a physical uplink control channel (PUCCH) only occupies a physical resource of one physical resource block (PRB) in a frequency domain in an unlicensed spectrum of a frequency band of 52.6 GHz to 71 GHz. For the unlicensed spectrum, when a system channel condition is poor, format 0/1/4 of the PUCCH may not be sent with a full power due to a limited transmit power of a single PRB, thereby limiting a coverage range of the PUCCH.

SUMMARY

According to a first aspect of the disclosure, a method for configuring a resource for an uplink control channel is provided and performed by a network side device. The method includes:

determining a transmit power required by a physical uplink control channel (PUCCH), and determining a number of physical resource blocks (PRBs) occupied by the PUCCH in a frequency domain according to the transmit power required by the PUCCH and maximum transmit power limit information of resource blocks; or determining a number of PRBs occupied by the PUCCH in a frequency domain according to PRB information in response to receiving the PRB information sent by a user equipment (UE); and configuring a transmit resource location of the PUCCH for the UE according to the number of PRBs occupied by the PUCCH in the frequency domain.

According to a second aspect of the disclosure, a network side device is provided and includes a memory, a transceiver and a processor.

The memory is configured to store a computer program, the transceiver is configured to transmit and receive data under a control of the processor, and the processor is configured to read the computer program in the memory and perform operations of:

determining a transmit power required by a PUCCH, and determining a number of PRBs occupied by the PUCCH in a frequency domain according to the transmit power required by the PUCCH and maximum transmit power limit information of resource blocks; or

determining a number of PRBs occupied by the PUCCH in a frequency domain according to PRB information in response to receiving the PRB information sent by a UE; and configuring a transmit resource location of the PUCCH for the UE according to the number of PRBs occupied by the PUCCH in the frequency domain.

According to a third aspect of the disclosure, a non-transitory processor-readable storage medium with a computer program stored thereon is provided, in which the computer program is configured to cause a processor to perform the method for configuring a resource for an uplink control channel as described in the first aspect of the disclosure.

BRIEF DESCRIPTION OF THE DRAWINGS

The above and/or additional aspects and advantages of the disclosure will become obvious and easy to understand from the following description of the embodiments in conjunction with the accompanying drawings, in which:

FIG. 1 is a flowchart illustrating a method for configuring a resource for an uplink control channel in embodiments of the disclosure:

FIG. 2 is a flowchart illustrating another method for configuring a resource for an uplink control channel in embodiments of the disclosure:

FIG. 3 is a flowchart illustrating determining a transmit power required by a PUCCH in embodiments of the disclosure:

FIG. 4 is a flowchart illustrating calculating a number of PRB occupied by a PUCCH in a frequency domain in embodiments of the disclosure:

FIG. 5 is a flowchart illustrating another calculating a number of PRB occupied by a PUCCH in a frequency domain in embodiments of the disclosure:

FIG. 6 is a diagram illustrating an implementation of determining a number of PRBs occupied by a PUCCH in a frequency domain according to PRB information sent by a UE in embodiments of the disclosure:

FIG. 7 is a block diagram illustrating a structure of a network side device in embodiments of the disclosure:

FIG. 8 is a block diagram illustrating a structure of an apparatus for configuring a resource for an uplink control channel in embodiments of the disclosure; and FIG. 9 is a block diagram illustrating a structure of another apparatus for configuring a resource for an uplink control channel in embodiments of the disclosure.

DETAILED DESCRIPTION

In embodiments of the disclosure, the term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

The term "plurality" or "multiple" in embodiments of the disclosure means two or more, which is similar to other quantifiers.

The technical solutions in embodiments of the disclosure will be described clearly and completely in combination with the accompanying drawings in the embodiments of the disclosure. It is obvious that the embodiments described are only part of embodiments in the disclosure, rather than all embodiments. On the basis of the embodiments of the disclosure, all other embodiments obtained by those skilled in the art without creative work are within the protection scope of the disclosure.

For the problem that a physical uplink control channel (PUCCH) occupies physical resource block(s) (PRB(s)) in a frequency domain, a method for configuring a resource for an uplink control channel, a network side device, an apparatus for configuring a resource for an uplink control channel, and a storage medium are provided in the disclosure in order to enhance a spectrum utilization rate of the system. In detail, a method for configuring a resource for an uplink control channel, a network side device, an apparatus for configuring a resource for an uplink control channel, and a storage medium in embodiments of the disclosure are described below in combination with the accompanying drawings.

FIG. 1 is a flowchart illustrating a method for configuring a resource for an uplink control channel in embodiments of the disclosure. It should be noted that, the method for configuring a resource for an uplink control channel in embodiments of the disclosure is applicable to an apparatus for configuring a resource for an uplink control channel in embodiments of the disclosure. For example, the apparatus may be configured in a network side device. In detail, the method for configuring a resource for an uplink control channel in embodiments of the disclosure may be described based on the network side device. As illustrated in FIG. 1, the method for configuring a resource for an uplink control channel includes steps 101 to 102.

At step 101, a transmit power required by a PUCCH is determined, and a number of PRBs occupied by the PUCCH in a frequency domain is determined according to the transmit power required by the PUCCH and maximum transmit power limit information of resource blocks.

It should be noted that, in an unlicensed spectrum of a frequency band of 52.6 GHz to 71 GHZ, a transmit power of a single resource block is limited in different countries and regions. Table 1 illustrates provisions of an equivalent isotropic radiated power (EIRP) and a power spectral density (PSD) in different countries and regions as below:

TABLE 1

| Regions | EIRP(dBm) | PSD(dBm/MHz) |
| --- | --- | --- |
| Europe/CEPT/South Africa | 40 | 13 |
| USA | 43 | no limit |
| Canada | 43 | no limit |
| Brazil | no limit | 12.5 |
| Mexico | 43 | no limit |
| CHINA | 47 | no limit |
| Japan | 23.9 | no limit |
| South Korea | 43 | 13 |
| India | 20 | no limit |
| Singapore | 40 | 13 |
| Australia | 47 | |
| TS 38.101(power class 3), Min peak EIRP (dBm) | 22.4 | no limit |
| TS 38.101(power class 3), Max EIRP (dBm) | 43 | no limit |
| TS 38.101(power class 3), Mid EIRP (dBm) | 32.7 | |
| system level simulations | 25 | |
| system level simulations(Optional) | 40 | |

That is, the network side device may determine the number of PRBs occupied by the PUCCH in the frequency domain according to the transmit power required by the PUCCH and maximum transmit power limit information of resource blocks, that is, limit information of the transmit power of the single resource block in different countries or regions. The network side device may be a base station. The network side device may configure a transmit resource location of the PUCCH for the UE according to the acquired information, which may solve the problem that the coverage range of the PUCCH is affected due to the limited transmit power.

In embodiments of the disclosure, the transmit power required by the PUCCH may be calculated by the network side device according to information sent by the UE. In addition, the network side device determines the number of PRBs occupied by the PUCCH in the frequency domain according to the transmit power required by the PUCCH and the maximum transmit power limit information of resource blocks by two manners, which may be implemented according to a configuration of a current unlicensed spectrum for an EIRP, a PSD and an SCS, in combination with the transmit power required by the PUCCH and the maximum transmit power of the PUCCH, or may be implemented according to a plurality of power threshold values for the PUCCH, and a plurality of threshold values for the number of PRBs, corresponding to the plurality of power threshold values, in combination with the transmit power required by the PUCCH.

At step 102, a transmit resource location of the PUCCH for the UE is configured according to the number of PRBs occupied by the PUCCH in the frequency domain.

Since the network side device has determined the number of PRBs occupied by the PUCCH in the frequency domain, the transmit resource location of the PUCCH for the UE may be configured according to the number of PRBs occupied by the PUCCH in the frequency domain, so that the number of expanded resource blocks may be adjusted as the transmit power varies and the PUCCH may not occupy too many resource blocks all the time, which improves the spectrum utilization rate of the system.

In embodiments of the disclosure, the network side device may configure the transmit resource location of the PUCCH for the UE, which may be implemented by the following way: in response to transmitting downlink control information (DCI) for uplink scheduling to the UE, the network side device may add a PUCCH resource index field in the DCI, and the UE may determine the transmit resource location of the PUCCH according to the PUCCH resource index field and related information.

According to the method for configuring a resource for an uplink control channel in embodiments of the disclosure, the number of PRBs occupied by the PUCCH in the frequency domain is determined according to the transmit power required by the PUCCH and the maximum transmit power limit information of resource blocks, so that the transmit resource location of the PUCCH may be configured for the UE, which not only solves the problem that the coverage range of the PUCCH is affected due to the limited transmit power of the single PRB for the unlicensed spectrum, but also adjusts the number of PRBs actually occupied by the PUCCH so that the PUCCH may not occupy too many resource blocks all the time, thereby improving the spectrum utilization rate of the system.

Since the network side device determines the number of PRBs occupied by the PUCCH in the frequency domain, it not only may be calculated according to the transmit power required by the PUCCH and the maximum transmit power limit information of resource blocks, but also may be determined according to PRB information sent by the UE, another method for configuring a resource for an uplink control channel is provided in embodiments of the disclosure.

FIG. 2 is a flowchart illustrating another method for configuring a resource for an uplink control channel in embodiments of the disclosure. As illustrated in FIG. 2, the method for configuring a resource for an uplink control channel includes step 201 to step 202.

At step 201, a number of PRBs occupied by the PUCCH in a frequency domain is determined according to PRB information in response to receiving the PRB information sent by a user equipment (UE).

It should be noted that the UE may calculate related data of the transmit power and the number of PRBs occupied by the PUCCH in the frequency domain, and report the information to the network side device, and the network side device calculates the number of PRBs occupied by the PUCCH in the frequency domain according to the reported information of the UE. That is, the network side device needs to calculate the number of PRBs occupied by the PUCCH in the frequency domain in another way in response to the received information sent by the UE being the information related to the PRB.

In embodiments of the disclosure, the UE may calculate the number of PRBs occupied by the PUCCH in the frequency domain according to a configuration of a current unlicensed spectrum for an EIRP, a PSD and an SCS, in combination with the transmit power required by the PUCCH and the maximum transmit power of the PUCCH, after calculating the transmit power itself. Alternatively, the UE may calculate the number of PRBs occupied by the PUCCH in the frequency domain according to a plurality of preset power threshold values for the PUCCH, and a plurality of threshold values for the number of PRBs, corresponding to the plurality of power threshold values, in combination with the transmit power required by the PUCCH. The UE reports PRB information to the network side deice after the above calculation, and the network side device may determine the number of PRBs occupied by the PUCCH in the frequency domain according to the PRB information.

At step 202, a transmit resource location of the PUCCH for the UE is configured according to the number of PRBs occupied by the PUCCH in the frequency domain.

Since the network side device has determined the number of PRBs occupied by the PUCCH in the frequency domain, the transmit resource location of the PUCCH for the UE may be configured according to the number of PRBs occupied by the PUCCH in the frequency domain, so that the number of expanded resource blocks may be adjusted as the transmit power varies and the PUCCH may not occupy too many resource blocks all the time, which improves the spectrum utilization rate of the system.

In embodiments of the disclosure, the network side device may configure the transmit resource location of the PUCCH for the UE, which may be implemented by the following way: in response to transmitting DCI for uplink scheduling to the UE, the network side device may add a PUCCH resource index field in the DCI, and the UE may determine the transmit resource location of the PUCCH according to the PUCCH resource index field and related information.

According to the method for configuring a resource for an uplink control channel in embodiments of the disclosure, the number of PRBs occupied by the PUCCH in the frequency domain is determined according to the received PRB information sent by the UE, so that the transmit resource location of the PUCCH may be configured for the UE, which not only solves the problem that the coverage range of the PUCCH is affected due to the limited transmit power of the single PRB for the unlicensed spectrum, but also adjusts the number of PRBs actually occupied by the PUCCH so that the PUCCH may not occupy too many resource blocks, thereby improving the spectrum utilization rate of the system.

In order to further illustrate the method for configuring a resource for an uplink control channel, for the implementation that the network side device determines the transmit power required by the PUCCH, other embodiments are provided in the disclosure. FIG. 3 is a flowchart illustrating that a network side device determines a transmit power required by a PUCCH in a method for configuring a resource for an uplink control channel. As illustrated in FIG. 3, according to the method for configuring a resource for an uplink control channel, provided in the above embodiments, the implementation that the network side device determines the transmit power required by the PUCCH may include steps 301 to 302.

At step 301, information related to calculating the transmit power, sent by the UE, is acquired.

In embodiments of the disclosure, the information sent by the UE includes any one of: an option in a pre-configured uplink path loss set; an option in a pre-configured transmit power set of the PUCCH; an option in a pre-configured power difference set, in which a power difference is a difference between the transmit power of the PUCCH and a maximum transmit power of the PUCCH; or an uplink path loss determined according to a power headroom (PH) report in a sounding reference signal (SRS), in which the SRS is configured by the network side device for the UE on a transmit broadband of the PUCCH. As an example, "pre-configured" in the embodiments may be configured by a high layer signaling.

The pre-configured uplink path loss set may be an uplink path loss set (a set of uplink path losses) or a path loss grade set (a set of path loss grades) of the UE. In embodiments of the disclosure, a path loss range corresponding to each path loss grade and a path loss calculated by the network side device corresponding to each path loss grade may be pre-configured by the high layer signaling.

In embodiments of the disclosure, the pre-configured transmit power set of the PUCCH may be a transmit power set (a set of transmit powers) or a transmit power grade set (a set of transmit power grades) of the PUCCH, pre-configured by the high layer signaling. The transmit power range of the UE corresponding to each transmit power grade, and the transmit power calculated by the network side device corresponding to each transmit power grade may be pre-configured by the high layer signaling.

In addition, in embodiments of the disclosure, the pre-configured power difference set is a set of differences between transmit powers of the PUCCH and the maximum transmit power of the PUCCH. The power difference is a difference grade, and a power difference range corresponding to each difference grade and a power difference calculated by a base station side corresponding to each difference grade may be pre-configured by the high layer signaling.

At step 302, the transmit power required by the PUCCH is determined according to the information sent by the UE.

Since content included in the information sent by the UE is different, the network side device needs to acquire the transmit power required by the PUCCH by adopting a corresponding calculation manner according to the information sent by the UE.

In embodiments of the disclosure, the implementation that the network side device determines the transmit power required by the PUCCH according to the information sent by the UE may be: determining the transmit power required by the PUCCH according to an uplink path loss sent by the UE and a target power of the PUCCH; determining a transmit power of the PUCCH, sent by the UE, as the transmit power required by the PUCCH; or determining the transmit power required by the PUCCH according to a power difference, sent by the UE, and the maximum transmit power of the PUCCH.

In embodiments of the disclosure, when the information sent by the UE includes the uplink path loss, the uplink path loss may be the option in the uplink path loss set pre-configured by the high layer signaling, or may be an uplink path loss determined according to a PH report in an SRS, and the network side device calculates the transmit power required by the PUCCH according to the uplink path loss and the target power of the PUCCH. The transmit power required by the PUCCH is calculated according to the target power of the PUCCH, the path loss, and power offsets of the PUCCH in different formats, a dynamic power adjustment factor and the maximum transmit power of the PUCCH. As an example, the calculation manner may be an equation (1) as below:

$$P_{PUCCH} = \min\begin{cases} P_{CMAX} \\ P_{O\_PUCCH} + PL + \Delta_{F\_PUCCH} + \Delta_{TF} \end{cases} \quad (1)$$

where, $P_{O\_PUCCH}$ is the target power, PL is the path loss, $\Delta_{F\_PUCCH}$ is the power offset in the different format, $\Delta_{TF}$ is the dynamic power adjustment factor, $P_{CMAX}$ is the maximum transmit power of the PUCCH, and $P_{PUCCH}$ is the transmit power required by the PUCCH.

In embodiments of the disclosure, when the information sent by the UE includes the transmit power of the PUCCH, the network side device directly determines the transmit power of the PUCCH sent by the UE as the transmit power required by the PUCCH.

In addition, when the information sent by the UE includes the power difference, the network side device determines the transmit power required by the PUCCH according to the power difference sent by the UE and the maximum transmit power of the PUCCH. As an example, the calculation manner may be an equation (2) as below:

$$P_{PUCCH} = P_{CMAX} - \Delta P \quad (2)$$

where, $\Delta P$ is the power difference between the transmit power and the maximum transmit power, $P_{CMAX}$ is the maximum transmit power of the PUCCH, and $P_{PUCCH}$ is the transmit power required by the PUCCH.

According to the method for configuring a resource of a downlink control channel in embodiments of the disclosure, the network side device calculates the transmit power required by the PUCCH by using a corresponding manner according to the different type of information sent by the UE, which increases the method applicability and provides a basis for the accurate calculation of the number of PRBs of the PUCCH in the frequency domain.

In order to achieve the method for configuring a resource of a downlink control channel in embodiments of the disclosure, a calculation process of the number of PRBs occupied by the PUCCH in the frequency domain is described in embodiments of the disclosure. FIG. 4 is a flowchart illustrating calculating a number of PRB occupied by a PUCCH in a frequency domain in the method for configuring a resource of a downlink control channel in embodiments of the disclosure. As illustrated in FIG. 4, steps 401 to 403 are included.

At step 401, the transmit power required by the PUCCH is compared with the maximum transmit power of the PUCCH.

It should be noted that, since the transmit power required by the PUCCH is not necessarily the maximum transmit power of the PUCCH, the transmit power required by the PUCCH may be compared with the maximum transmit power of the PUCCH, and a subsequent calculation process is determined according to a comparison result.

In embodiments of the disclosure, according to the comparison between the transmit power required by the PUCCH and the maximum transmit power of the PUCCH, when the transmit power required by the PUCCH is less than the maximum transmit power of the PUCCH, step 402 is executed, and when the transmit power required by the PUCCH is greater than or equal to the maximum transmit power of the PUCCH, step 403 is executed.

At step 402, the number of PRBs occupied by the PUCCH in the frequency domain is calculated according to the transmit power required by the PUCCH and the maximum transmit power limit information of resource blocks.

In embodiments of the disclosure, when the transmit power required by the PUCCH is less than the maximum transmit power of the PUCCH, step 402 is executed, and it indicates that the PUCCH does not reach the maximum transmit power of the PUCCH, so the number of PRBs occupied by the PUCCH in the frequency domain is calculated directly according to the transmit power required by the PUCCH. That is, the number of PRBs occupied by the PUCCH in the frequency domain may be calculated according to the transmit power required by the PUCCH and the maximum transmit power limit information of resource blocks. As an example, the calculation manner may be an equation (3) as below:

$$M_{RB}^{PUCCH} = \frac{1}{12 k_{SCS}} \times 10^{\frac{P_{PUCCH} - P_{PSD}}{10}} \quad (3)$$

where, $P_{PUCCH} < P_{CMAX}$, $$M_{RB}^{PUCCH}$$

is the number of PRBs occupied by the PUCCH in the PUCCH frequency domain, $P_{PUCCH}$ is the transmit power required by the PUCCH, $P_{CMAX}$ is the maximum transmit power of the PUCCH, $P_{PSD}$ is a configuration of a PSD for a current unlicensed spectrum, and $k_{SCS}$ is a configuration of an SCS for the current unlicensed spectrum.

At step 403, a maximum number of PRBs occupied by the PUCCH in the frequency domain is determined as the number of PRBs occupied by the PUCCH in the frequency domain.

In embodiments of the disclosure, when the transmit power required by the PUCCH is greater than or equal to the maximum transmit power of the PUCCH, it indicates that the PUCCH has reached the maximum transmit power of the PUCCH, so the maximum number of PRBs occupied by the PUCCH in the frequency domain is the number of PRBs occupied by the PUCCH in the frequency domain.

It should be noted that, in embodiments of the disclosure, there are a plurality of manners for determining the maximum number of PRBs occupied by the PUCCH in the frequency domain, and the manners for determining the maximum number of PRBs occupied by the PUCCH in the frequency domain are described in three examples.

As an example, the maximum number of PRBs occupied by the PUCCH in the frequency domain is determined according to preset configuration information of an EIRP, a PSD and an SCS for a current unlicensed spectrum. For example, a calculation process of the maximum number of PRBs occupied by the PUCCH in the frequency domain may be implemented by an equation (4) as below:

$$N_{PRB}^{max} = \frac{1}{12k_{SCS}} \times 10^{\frac{P_{EIRP}-P_{PSD}}{10}} \quad (4)$$

where, $$N_{PRB}^{max}$$

is the maximum number of PRBs occupied by the PUCCH in the frequency domain, $P_{EIRP}$ is the configuration of the EIRP for the current unlicensed spectrum, $P_{PSD}$ is the configuration of the PSD for the current unlicensed spectrum, and $k_{SCS}$ is the configuration of the SCS for the current unlicensed spectrum.

As another example, the maximum number of PRBs occupied by the PUCCH in the frequency domain is determined by: determining the maximum number of PRBs occupied by the PUCCH in the frequency domain according to an EIRP limit of the UE and configuration information of a PSD and an SCS for the current unlicensed spectrum. As an implementation, the calculation process may be implemented by an equation (5) as below:

$$N_{PRB\_UE}^{max} = \frac{1}{12k_{SCS}} \times 10^{\frac{P_{EIRP\_UE}-P_{PSD}}{10}} \quad (5)$$

where, $$N_{PRB\_UE}^{max}$$

is the maximum number of PRBs occupied by the PUCCH in the frequency domain, $P_{EIRP\_UE}$ is the limit of the UE for the EIRP, $P_{PSD}$ is the configuration of the PSD for the current unlicensed spectrum, and $k_{SCS}$ is the configuration of the SCS for the current unlicensed spectrum. It should be noted that, if the limit of the UE for the EIRP is unknown, $$N_{PRB\_UE}^{max}$$

is determined according to a UE capability of a lowest grade.

As another example, the maximum number of PRBs occupied by the PUCCH in the frequency domain may be further determined by: calculating a first intermediate value of the number of PRBs occupied by the PUCCH in the frequency domain according to configuration information of an EIRP, a PSD and an SCS for a current unlicensed spectrum, and calculating a second intermediate value of the number of PRBs occupied by the PUCCH in the frequency domain according to an EIRP limit of the UE and configuration information of a PSD and an SCS for a current unlicensed spectrum, and determining a minimum value between the first intermediate value and the second intermediate value as the maximum number of PRBs occupied by the PUCCH in the frequency domain. Calculating the first intermediate value of the number of PRBs occupied by the PUCCH in the frequency domain according to configuration information of the EIRP, the PSD and the SCS for the current unlicensed spectrum, may be implemented by the above equation (4), and the obtained $$N_{PRB}^{max}$$

is the first intermediate value of the number of PRBs occupied by the PUCCH in the frequency domain; calculating the second intermediate value of the number of PRBs occupied by the PUCCH in the frequency domain according to the EIRP limit of the UE and the configuration information of the PSD and the SCS for the current unlicensed spectrum, may be implemented by the above equation (5), and the obtained $$N_{PRB\_UE}^{max}$$

is the second intermediate value of the number of PRBs occupied by the PUCCH in the frequency domain; and the minimum value between the first intermediate value and the second intermediate value is determined as the maximum number of PRBs occupied by the PUCCH in the frequency domain.

According to the method for configuring a resource for an uplink control channel in embodiments of the disclosure, the transmit power required by the PUCCH may be compared with the maximum transmit power of the PUCCH, and in response to the transmit power required by the PUCCH being less than the maximum transmit power of the PUCCH, the network side device calculates the number of PRBs occupied by the PUCCH in the frequency domain according to the transmit power required by the PUCCH and the maximum transmit power limit information of resource blocks; and in response to the transmit power required by the PUCCH being greater than or equal to the maximum transmit power of the PUCCH, the network side device uses the maximum number of PRBs occupied by the PUCCH in the frequency domain. The situation that too many resource blocks are configured for the user when the transmit power required by the PUCCH is less than the maximum transmit power of the PUCCH is avoided, so that an additional system resource overhead is effectively avoided and the PUCCH may not occupy too many resource blocks all the time, thereby improving the spectrum utilization rate of the system.

In order to achieve the method for configuring a resource for an uplink control channel in the above embodiments, another process of calculating the number of PRBs occupied by the PUCCH in the frequency domain is described in embodiments of the disclosure. FIG. 5 is a flowchart illustrating another calculating a number of PRBs occupied by the PUCCH in a frequency domain in embodiments of the disclosure. As illustrated in FIG. 5, steps 501 to 502 are included.

At step 501, a plurality of preset power threshold values for the PUCCH, and a plurality of threshold values for the number of PRBs, corresponding to the plurality of power threshold values, are determined.

It may be understood that, in embodiments of the disclosure, the plurality of power threshold values are preset for the PUCCH. The plurality of power threshold values are different. If the plurality of power threshold values are arranged from small to large, a segment between each two adjacent power thresholds correspond to one threshold value for the PRB. As an example, the plurality of preset power threshold values for the PUCCH and the plurality of threshold values for the number of PRBs, corresponding to the plurality of power threshold values, may be illustrated in equation (6) as below:

$$P_{PUCCH} < P_{th}(1) \quad M_{RB}^{PUCCH} = N_{RB}(1) \quad (6)$$
$$P_{th}(1) \le P_{PUCCH} < P_{th}(2) \quad M_{RB}^{PUCCH} = N_{RB}(2)$$
$$P_{th}(2) \le P_{PUCCH} < P_{th}(3) \quad M_{RB}^{PUCCH} = N_{RB}(3)$$
$$\dots$$
$$P_{th}(m-1) \le P_{PUCCH} < P_{th}(m) \quad M_{RB}^{PUCCH} = N_{RB}(m)$$
$$\dots$$
$$P_{th}(m-1) \le P_{PUCCH} < P_{th}(M) \quad M_{RB}^{PUCCH} = N_{RB}(M)$$

where, m is an integer from 1 to M, $P_{th}$ (m) is the preset power threshold value for the PUCCH, $N_{RB}(m)$ is the threshold value for the number of PRBs corresponding to the power threshold value, $N_{RB}(m)$ is greater than or equal to 1 and less than or equal to the maximum number $$N_{PRB}^{max}$$

of PRBs occupied by the PUCCH in the frequency domain, $N_{RB}$ (m) is a set of continuous or discontinuous positive integers, $P_{PUCCH}$ is the transmit power required by the PUCCH, and $$M_{RB}^{PUCCH}$$

is the number of PRBs occupied by the PUCCH in the frequency domain.

At step 502, the number of PRBs occupied by the PUCCH in the frequency domain is determined from the plurality of threshold values according to a comparison result between the transmit power required by the PUCCH and each of the plurality of power threshold values.

It may be understood that, the transmit power required by the PUCCH is compared with a range constituted by each two adjacent power thresholds when the plurality of power threshold values are arrange in the order of small to large, the range constituted by the power threshold values where the transmit power required by the current PUCCH is located is found, a corresponding threshold value for the number of PRBs is acquired according to the range constituted by the power threshold values, and the threshold value for the number of PRBs is determined as the number of PRBs occupied by the PUCCH in the frequency domain. For example, a corresponding $P_{th}$ (m) range is found in the equation (6) according to the transmit power $P_{PUCCH}$ required by the PUCCH, and if $P_{PUCCH} < P_{th}$ (1), the number of PRBs occupied by the PUCCH in the frequency domain is $$M_{RB}^{PUCCH} = N_{RB}(1);$$

and if $P_{th}$ (m−1)≤$P_{PUCCH}$<$P_{th}$ (m), the number of PRBs occupied by the PUCCH in the frequency domain is $$M_{RB}^{PUCCH} = N_{RB}(m).$$

It should be noted that, in response to the transmit power required by the PUCCH being greater than or equal to a maximum value among the plurality of power threshold values, a maximum number of PRBs occupied by the PUCCH in the frequency domain is determined according to the maximum transmit power limit information of resource blocks, and the maximum number of PRBs occupied by the PUCCH in the frequency domain is determined as the number of PRBs occupied by the PUCCH in the frequency domain. That is, in response to the transmit power required by the PUCCH being greater than or equal to the maximum value among the plurality of power threshold values, the number of PRBs occupied by the PUCCH in the frequency domain is equal to the maximum number of PRBs occupied by the PUCCH in the frequency domain. The maximum number of PRBs occupied by the PUCCH in the frequency domain is determined according to the maximum transmit power limit information of resource blocks. For example, if the transmit power $P_{PUCCH}$ required by the PUCCH is greater than or equal to $P_{th}$ (M) in the equation (6), that is, $P_{PUCCH} \ge P_{th}$ (M), the number of PRBs occupied by the PUCCH in the frequency domain is $$M_{RB}^{PUCCH}$$

is equal to a maximum number $$N_{PRB}^{max}$$

of PRBs occupied by the PUCCH in the frequency domain, that is, $$M_{RB}^{PUCCH} = N_{PRB}^{max}.$$

The maximum number of PRBs occupied by the PUCCH in the frequency domain is determined according to the maximum transmit power limit information of resource blocks, and the specific calculation manner has been described in the above embodiments, which are not described.

According to the method for configuring a resource for an uplink control channel in embodiments of the disclosure, the network side device determines the number of PRBs occupied by the PUCCH in the frequency domain from the plurality of threshold values according to the comparison result between the transmit power required by the PUCCH and each of the plurality of power threshold values, on the basis of the plurality of preset power threshold values for the PUCCH and the plurality of threshold values for the number of PRBs corresponding to the plurality of power threshold values, and calculation of the number of PRBs occupied by the PUCCH in the frequency domain depends on the plurality of preset power threshold values and the threshold values, so that resource allocation has strong the controllability, meanwhile, the PUCCH does not occupy too many resource blocks all the time, thereby improving the spectrum utilization rate of the system.

In the method for configuring a resource for an uplink control channel provided in the above embodiments, the number of PRBs occupied by the PUCCH in the frequency domain, not only may be calculated by the network side device according to the transmit power required by the PUCCH and the maximum transmit power limit information of resource blocks, but also may be determined according to the received PRB information sent by the UE. The embodiments of the disclosure illustrate the implementation of determining the number of PRBs occupied by the PUCCH in the frequency domain according to the received PRB information sent by the UE in embodiments of the disclosure. FIG. 6 is a diagram illustrating an implementation of determining a number of PRBs occupied by a PUCCH in a frequency domain.

In embodiments of the disclosure, the UE may calculate the related information of the transmit power and the number of PRBs occupied by the PUCCH in the frequency domain, and report the information to the network side device, and the network side device calculates the number of PRBs occupied by the PUCCH in the frequency domain according to the reported information of the UE. That is, the network side device needs to calculate the number of PRBs occupied by the PUCCH in the frequency domain by using another way in response to the received information sent by the UE being information related to the PRB.

The PRB information sent by the UE includes any one of: a number of PRBs occupied by the PUCCH in the frequency domain, calculated by the UE according to the transmit power required by the PUCCH and the maximum transmit power limit information of resource blocks; an index value of a number of available PRBs, sent by the UE according to the number of PRBs occupied by the PUCCH in the frequency domain; or a parameter value for a number of PRBs, sent by the UE according to the number of PRBs occupied by the PUCCH in the frequency domain.

In embodiments of the disclosure, when the PRB information sent by the UE, acquired by the network side device, includes the number of PRBs occupied by the PUCCH in the frequency domain, calculated by the UE according to the transmit power required by the PUCCH and the maximum transmit power limit information of resource blocks, the network side device executes step 601; when the PRB information sent by the UE, acquired by the network side device, includes the index value of the number of available PRBs, sent by the UE according to the number of PRBs occupied by the PUCCH in the frequency domain, the network side device executes step 602; or when the PRB information sent by the UE, acquired by the network side device, includes the parameter value for the number of PRBs, sent by the UE according to the number of PRBs occupied by the PUCCH in the frequency domain, the network side device executes step 603.

At step 601, the number of PRBs sent by the UE is determined as the number of PRBs occupied by the PUCCH in the frequency domain.

In embodiments of the disclosure, when the PRB information sent by the UE, acquired by the network side device, includes the number of PRBs occupied by the PUCCH in the frequency domain, calculated by the UE according to the transmit power required by the PUCCH and the maximum transmit power limit information of resource blocks, the network side device determines the number of PRBs sent by the UE as the number of PRBs occupied by the PUCCH in the frequency domain, that is, the number of PRBs sent by the UE is equal to the number of PRBs occupied by the PUCCH in the frequency domain.

It should be noted that, the manner for calculating by the UE the transmit power required by the PUCCH may be illustrated in an equation (1). In addition, an implementation of the number of PRBs occupied by the PUCCH in the frequency domain, calculated by the UE according to the transmit power required by the PUCCH and the maximum transmit power limit information of resource blocks, is consistent with an implementation in FIG. 4 in the above embodiments, which will not be repeated herein.

At step 602, the number of PRBs occupied by the PUCCH in the frequency domain is determined according to the index value of the number of available PRBs, sent by the UE, and a preset PRB number available set of a high layer signaling.

In embodiments of the disclosure, the system presets the PRB number available set by the high layer signaling. When the UE calculates the number of PRBs occupied by the PUCCH in the frequency domain according to the transmit power required by the PUCCH and the maximum transmit power limit information of resource blocks, the index value of the number of available PRBs of the PRB number available set preset by the high layer signaling is obtained according to the number calculated of PRBs occupied by the PUCCH in the frequency domain and the preset PRB number available set preset by the high layer signaling. When the UE reports the index value to the network side device, the network side device may find the corresponding number of PRBs according to the index value of the number of available PRBs, sent by the UE, and the PRB number available set preset by the high layer signaling, that is, the number of PRBs occupied by the PUCCH in the frequency domain.

At step 603, the number of PRBs occupied by the PUCCH in the frequency domain is determined according to the parameter value for the number of PRBs, sent by the UE, and a calculation formula of the number of PRBs, preset by a high layer signaling.

In embodiments of the disclosure, the system presets the calculation formula of the number of PRBs according to the high layer signaling. When the number of PRBs occupied by the PUCCH in the frequency domain, is calculated by the UE according to the transmit power required by the PUCCH and the maximum transmit power limit information of resource blocks, the parameter value for the number of PRBs of the calculation formula of the number of PRBs preset by the high layer signaling is obtained according to the calculated number of PRBs occupied by the PUCCH in the frequency domain and the calculation formula of the number of PRBs preset by the high layer signaling. When the UE reports the parameter value to the network side device, the network side device may calculate the corresponding number of PRBs according to the parameter value for the number of PRBs, sent by the UE, and the calculation formula of the number of PRBs, preset by the high layer signaling.

For example, the calculation formula of the number of PRBs, preset by the high layer signaling, is illustrated in an equation (7):

$$M_{RB}^{PUCCH} = 2 \times PRB\_report \qquad (7)$$

where $$M_{RB}^{PUCCH}$$

is the calculated number of PRBs occupied by the PUCCH in the frequency domain, and $PRB_{report}$ is theee parameter value for the number of PRBs. That is, the UE substitutes the number of PRBs occupied by the PUCCH in the frequency domain calculated into the equation (7), to obtain the parameter value for the number of PRBs, that is, the value of $PRB_{report}$. When the UE reports the value of $PRB_{report}$ to the network side device, the network side device calculates the number of PRBs occupied by the PUCCH in the frequency domain according to the value of $PRB_{report}$ sent by the UE in combination with the equation (7).

According to the method for configuring a resource of a downlink control channel in embodiments of the disclosure, the network side device may calculate the number of PRBs occupied by the PUCCH in the frequency domain according to different types of PRB information sent by the UE according to the corresponding manners, and the number of PRBs occupied by the PUCCH in the frequency domain is determined by recognizing different PRB information sent by the UE, which improves the spectrum utilization rate of the system and the applicability of the method.

In the method for configuring a resource of a downlink control channel in the above embodiments, configuring the transmit resource location of the PUCCH for the UE according to the number of PRBs occupied by the PUCCH in the frequency domain is included. Next, the implementation of configuring the transmit resource location of the PUCCH for the UE according to the number of PRBs occupied by the PUCCH in the frequency domain is further explained.

In embodiments of the disclosure, configuring the transmit resource location of the PUCCH for the UE according to the number of PRBs occupied by the PUCCH in the frequency domain includes: in response to transmitting DCI for uplink scheduling, adding a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

That is, the network side device indicates the PUCCH resource in DCI scheduling in two implementations: a first implementation is a manner of supporting a frequency hopping according to a continuous resource configuration in the related art, in which a PUCCH resource index field is added in the DCI for uplink scheduling and the UE determines the transmit resource location of the PUCCH according to the number of PRBs occupied by the PUCCH in the frequency domain and the PUCCH resource index value; and a second manner is a manner of supporting a discontinuous resource configuration, in which the UE does not need to calculate a number of PRBs, a PUCCH resource index field is added in the DCI for uplink scheduling, and the UE determines the transmit resource location of the PUCCH according to the PUCCH resource index value.

In embodiments of the disclosure, the first implementation is a manner of supporting a frequency hopping according to a continuous resource configuration in the related art, in which the high layer signaling configures a plurality of resource sets for the UE in advance. Each resource set corresponds to a different number of resource blocks, and the resource set may be pre-configured as a PUCCH_PRB. The number $$M_{RB}^{PUCCH}$$

of PRBs occupied by the PUCCH in the frequency domain may be obtained by the calculation manner of the above embodiments. When the number $$M_{RB}^{PUCCH}$$

of PRBs occupied by the PUCCH in the frequency domain is obtained, it may be understood that the UE may find a resource set with a number of resource blocks equal to the number of PRBs occupied by the PUCCH in the frequency domain according to $$M_{RB}^{PUCCH}$$

and a plurality of resource sets configured for the UE in advance according to the high layer signaling, and search a resource location in the resource set.

It should be noted that, in embodiments of the disclosure, in order to indicate the corresponding resource location, the network side device calculates the PUCCH resource index value according to a 3-bit field resource indication value $\Delta_{PRI}$ of the DCI and in combination with a control channel elements (CCE) number. As an example, the calculation manner may be as illustrated in an equation (8) as below:

$$(8)$$

$$r_{PUCCH} =$$

$$\begin{cases} \left\lfloor \dfrac{n_{CCE,p} \cdot \lceil R_{PUCCH}/8 \rceil}{N_{CCE,p}} \right\rfloor + & \text{if } \Delta_{PRI} < R_{PUCCH} \bmod 8 \\[2mm] \Delta_{PRI} \cdot \left\lceil \dfrac{R_{PUCCH}}{8} \right\rceil \\[2mm] \left\lfloor \dfrac{n_{CCE,p} \cdot \lfloor R_{PUCCH}/8 \rfloor}{N_{CCE,p}} \right\rfloor + & \text{if } \Delta_{PRI} \geq R_{PUCCH} \bmod 8 \\[2mm] \Delta_{PRI} \cdot \left\lfloor \dfrac{R_{PUCCH}}{8} \right\rfloor + R_{PUCCH} \bmod 8 \end{cases}$$

where, $r_{PUCCH}$ is the PUCCH resource index value, $n_{CCE,p}$ is the CCE number in DCI scheduling, $R_{PUCCH}$ is a number of PUCCH resources configured in a resource table, and $N_{CCE,p}$ is a number of CCEs in DCI scheduling. That is, when the network side device sends DCI for the uplink scheduling to the UE, the PUCCH resource index field is added in the DCI for the uplink scheduling, and the PUCCH resource index field includes a calculated PUCCH resource index value $r_{PUCCH}$.

In embodiments of the disclosure, the UE acquires the PUCCH resource index value $r_{PUCCH}$, and determines the transmit resource location of the PUCCH according to the number of PRBs occupied by the PUCCH in the frequency domain and the PUCCH resource index value, and the transmit resource location of the PUCCH is based on the determined resource set. As an example, the implementation that the UE determines the transmit resource location of the PUCCH according to the number of PRBs occupied by the PUCCH in the frequency domain and the PUCCH resource index value may be that: the UE determines an initial PRB index of a first frequency hopping according to an equation (9), and determines an initial PRB index of a second frequency hopping according to an equation (10), and placing remaining PRBs from the initial PRB. The equation (9) and the equation (10) are as follow:

$$RB_{BWP}^{offset} + \lfloor r_{PUCCH}/N_{CS} \rfloor \times \text{PUCCH\_PRB} \qquad (9)$$

$$N_{BWP}^{size} - 1 - RB_{BWP}^{offset} - \lfloor r_{PUCCH}/N_{CS} \rfloor \times \text{PUCCH\_PRB} \qquad (10)$$

where, $N_{CS}$ is a number of supported cyclic shifts, $$RB_{BWP}^{offset}$$

is a PRB offset value, $$N_{BWP}^{size}$$

is a bandwidth size, and $r_{PUCCH}$ is the PUCCH resource index value.

In addition, the second implementation is a manner of supporting a discontinuous resource configuration, in which the UE does not need to calculate the number of PRBs, and the network side device indicates different number of PRBs via the resource index, that is, the number of PRBs is distinguished by the resource index, and a number of indexes supported by the PUCCHs with different numbers of PRBs is preset. The UE may calculate a PRB length and an index directly according to the acquired PUCCH resource index value $r_{PUCCH}$. It should be noted that, the manner that the network side device calculates the PUCCH resource index value $r_{PUCCH}$ is consistent with the first implementation, which are not repeated herein.

As an example, assuming that the supported PRB length is an enumeration class PUCCH_PRB {PRB 1, PRB 2, PRB 3}, the number of indexes supported by each PRB length is an enumeration class PUCCH_number {N1, N2, N3}, in which N1, N2, N3 are integer multiples of $N_{CS}$. When the supported PRB interval is $\Delta n$, the UE may calculate the PRB length and the index value according to an equation (11):

an $m^{th}$ PRB index of the PUCCH is $RB_{BWP}^{offset} +$ \qquad (11)

$$\lfloor r_{PUCCH}/N_{CS} \rfloor + m \times \Delta n,$$

$$\text{where,} \begin{cases} r_{PUCCH} < N1, & 0 \le m < PRB1 \\ N1 \le r_{PUCCH} < N1+N2, & 0 \le m < PRB2 \\ r_{PUCCH} \ge N1+N2, & 0 \le m < PRB3 \end{cases}$$

$\Delta n$ controls an interval between a plurality of RBs, and when $\Delta n=1$, an RB resource location is continuous, $\Delta n$ is pre-configured by a higher layer signaling, $N_{CS}$ is a number of supported cyclic shifts, $$RB_{BWP}^{offset}$$

is a PRB offset value, and $r_{PUCCH}$ is the PUCCH resource index value.

In the method for configuring a resource in the uplink control channel in embodiments of the disclosure, in response to transmitting DCI for uplink scheduling to the UE, the network side device may add the PUCCH resource index field in the DCI, so that the UE may determine the transmit resource location of the PUCCH according to the related information, which achieves the resource configuration of the PUCCH. The number of PRBs occupied by the PUCCH in the frequency domain is determined according to the transmit power required by the PUCCH and the maximum transmit power limit information of resource blocks, so that the problem that the coverage range of the PUCCH is affected due to the limited transmit power is solved, and the PUCCH may not occupy too many resource blocks all the time, thereby improving the spectrum utilization rate of the system.

The method for configuring a resource in the uplink control channel in all embodiments of the disclosure, is based on an implementation that the UE is in a connected state. However, when the UE is in an initial access process, the method for configuring a resource of an uplink control channel may vary. Therefore, another method for configuring a resource for an uplink control channel in embodiments of the disclosure is provided according to the state that the UE is in an initial access process.

In embodiments of the disclosure, in an initial access process of the UE, the method for configuring a resource in the uplink control channel further includes: indicating the number of PRBs occupied by the PUCCH in the frequency domain in a broadcast system information block SIB1, and determining the transmit resource location of the PUCCH via a physical resource indication (PRI) in DCI for uplink scheduling.

The method includes: adding a PRB number indication field via DCI of a message MSG4 to indicate the number of PRBs occupied by the PUCCH in the frequency domain, and adding a PUCCH resource index field in the DCI for uplink scheduling to indicate the UE to determine the transmit resource location of the PUCCH according to the number of PRBs occupied by the PUCCH in the frequency domain and a PUCCH resource index value.

The method includes: indicating related parameters for determining the number of PRBs occupied by the PUCCH in the frequency domain in a broadcast system information block SIB1, indicating a PUCCH resource index via a 3-bit field resource indication value $\Delta_{PRI}$ of DCI for uplink scheduling and a control channel elements (CCE) number, and indicating the number of PRBs occupied by the PUCCH in the frequency domain via the PUCCH resource index and the related parameters.

The method includes: adding a common resource index field to a broadcast system information block SIB1 according to a pre-configured common resource index table, to indicate the UE to search the common resource index table according to a common resource index, to determine the number of PRBs occupied by the PUCCH in the frequency domain, wherein different index values in the common resource index table correspond to different numbers of PRBs.

The method includes: acquiring related parameters for determining the number of PRBs occupied by the PUCCH in the frequency domain in a message Msg3 sent by the UE, indicating a PUCCH resource index via a 3-bit field resource indication value $\Delta_{PRI}$ of DCI for uplink scheduling and a CCE number, and indicating the number of PRBs occupied by the PUCCH in the frequency domain via the PUCCH resource index and the related parameters.

The implementation of indicating the number of PRBs occupied by the PUCCH in the frequency domain in the broadcast system information block SIB1, and determining the transmit resource location of the PUCCH via a PRI in DCI for uplink scheduling is illustrated in the form of an example. For example, for a preset enumeration class PUCCH_PRB {PRB1, PRB4, PRB8}, one or more in the enumeration class PUCCH_PRB {PRB1, PRB4, PRB8} is indicated as a PUCCH_PRB in the broadcast system information block SIB1. If a plurality of values are indicated, the UE needs to report an index value for assistance. Next, the transmit resource location of the PUCCH is determined via the PRI in the DCI for uplink scheduling. The network side device indicates the PUCCH index value $r_{PUCCH}$ via the 3-bit field resource indication value $\Delta_{PRI}$ of the DCI in combination with the CCE number, which may be calculated as shown in the equation (8) in the above embodiments. The UE determines the transmit resource location of the PUCCH according to the number of PRBs occupied by the PUCCH in the frequency domain and the PUCCH resource index value. As an example, the UE determines an initial PRB index of a first frequency hopping according to the equation (9), and determines an initial PRB index of a second frequency hopping according to the equation (10), and replacing remaining PRBs in sequence from the initial PRB.

In embodiments of the disclosure, a PRB number indication field is added via DCI of a message MSG4, to indicate the number of PRBs occupied by the PUCCH in the frequency domain, and a PUCCH resource index field is added in the DCI for uplink scheduling to indicate the UE to determine the transmit resource location of the PUCCH according to the number of PRBs occupied by the PUCCH in the frequency domain and the PUCCH resource index value. The specific implementation may be that: the network side device adds the PRB number indication field via the DCI of the message Msg4, to indicate the number of PRBs occupied by the PUCCH in the frequency domain, and the PUCCH resource index value $r_{PUCCH}$ is further determined via the 3-bit field in the DCI $\Delta_{PRI}$ in combination with the CCE number, and the calculation process of the PUCCH resource index value may be as shown in the equation (8). The UE determines the transmit resource location of the PUCCH according to the number of PRBs occupied by the PUCCH in the frequency domain and the PUCCH resource index value. As an example, the UE may determine the initial PRB index of the first frequency hopping according to the equation (9), and determine the initial PRB index of the second frequency hopping according to the equation (10), and replacing remaining PRBs in sequence from the initial PRB.

In addition, in embodiments of the disclosure, related parameters for determining the number of PRBs occupied by the PUCCH in the frequency domain are indicated in the broadcast system information block SIB1, a PUCCH resource index is indicated via a 3-bit field resource indication value $\Delta_{PRI}$ of the DCI for uplink scheduling and a CCE number, and the number of PRBs occupied by the PUCCH in the frequency domain is indicated via the PUCCH resource index and the related parameters, which may be implemented in the following manner. First, the related parameters for determining the number of PRBs occupied by the PUCCH in the frequency domain are indicated in the broadcast system information block SIB1; then, the network side device further determines the PUCCH resource index value $r_{PUCCH}$ via the 3-bit field $\Delta_{PRI}$ in the DCI in combination with the CCE number, and the calculation process may be as shown in the equation (8); and then, the network side device indicates the number of PRBs occupied by the PUCCH in the frequency domain according to the PUCCH resource index value $r_{PUCCH}$ and the related parameters in the SIB1, as an example, which may be implemented according to an equation (12):

$$PUCCH\_PRB = \left\lceil \frac{r_{PUCCH}}{16} \right\rceil \times K, \tag{12}$$

where K is a parameter configured by the SIB1, PUCCH_PRB is a number of PRBs occupied by the PUCCH in the frequency domain, and $r_{PUCCH}$ is a PUCCH resource index value, which may be implemented in the following manner: a plurality of PUCCH_PRB numbers are enumerated in the SIB1, and $\lfloor r_{PUCCH}/16 \rfloor$ is taken as an index value to indicate the number of PRBs used; finally, the UE may determine the initial PRB index of the first frequency hopping according to the equation (9), determine the initial PRB index of the second frequency hopping according to the equation (10), and replacing remaining PRBs in a continuous order from the initial PRB, thereby determining the transmit resource location of the PUCCH.

In addition, in embodiments of the disclosure, a common resource index field may be added in the broadcast system information block SIB1 according to a pre-configured common resource index table, to indicate the UE to search the common resource index table according to a common resource index, to determine the number of PRBs occupied by the PUCCH in the frequency domain. Different index values in the common resource index table correspond to different PRBs. Table 2 is an example of a common resource index table. The number of PRBs is determined by indexing the table according to the common resource index table in the broadcast system information block SIB1.

TABLE 2

| Index | PUCCH format | First symbol | Number of symbols | Number of PRBs | PRB offset $RB_{BWP}^{offset}$ | Set of initial CS indexes |
|---|---|---|---|---|---|---|
| 0 | 0 | 12 | 2 | 1 | 0 | {0, 3} |
| 1 | 0 | 12 | 2 | 16 | 0 | {0, 4, 8} |
| 2 | 0 | 12 | 2 | 32 | 3 | {0, 4, 8} |
| 3 | 1 | 10 | 4 | 1 | 0 | {0, 6} |
| 4 | 1 | 10 | 4 | 16 | 0 | {0, 3, 6, 9} |
| 5 | 1 | 10 | 4 | 32 | 2 | {0, 3, 6, 9} |
| 6 | 1 | 10 | 4 | 1 | 4 | {0, 3, 6, 9} |
| 7 | 1 | 4 | 10 | 16 | 0 | {0, 6} |
| 8 | 1 | 4 | 10 | 32 | 0 | {0, 3, 6, 9} |

TABLE 2-continued

| Index | PUCCH format | First symbol | Number of symbols | Number of PRBs | PRB offset $RB_{BWP}^{offset}$ | Set of initial CS indexes |
|---|---|---|---|---|---|---|
| 9 | 1 | 4 | 10 | 1 | 2 | {0, 3, 6, 9} |
| 10 | 1 | 4 | 10 | 16 | 4 | {0, 3, 6, 9} |
| 11 | 1 | 0 | 14 | 32 | 0 | {0, 6} |
| 12 | 1 | 0 | 14 | 1 | 0 | {0, 3, 6, 9} |
| 13 | 1 | 0 | 14 | 16 | 2 | {0, 3, 6, 9} |
| 14 | 1 | 0 | 14 | 32 | 4 | {0, 3, 6, 9} |
| 15 | 1 | 0 | 14 | 64 | $\lfloor N_{BWP}^{size}/4 \rfloor$ | {0, 3, 6, 9} |

In addition, in embodiments of the disclosure, related parameters for determining number of PRBs occupied by the PUCCH in the frequency domain in a message Msg3 sent by the UE may be acquired, a PUCCH resource index may be indicated via a 3-bit field $\Delta_{PRI}$ of the DCI for uplink scheduling and a CCE number, and the number of PRBs occupied by PUCCH in the frequency domain may be indicated via the PUCCH resource index and the related parameters.

According to the method for configuring a resource in the uplink control channel in embodiments of the disclosure, when the UE is in the initial access process, the number of PRBs occupied by the PUCCH in the frequency domain is indicated by SIB1, MSG4, MSG3 and DCI respectively, the network side device adds the PUCCH resource index field in the DCI for uplink scheduling, and the UE determines the transmit resource location of the PUCCH according to the information, which achieves a resource configuration of the PUCCH, and improves applicability of the method, so that it is applicable not only when UE is in the connected state, but also when the UE is in the initial access process.

In order to achieve the above embodiment, a network side device is further provided in the disclosure. As illustrated in FIG. 7, the device includes: a memory 710, a transceiver 720 and a processor 730, to achieve data transmission via a bus interface.

The memory 710 is configured to store a computer program.

The transceiver 720 is configured to transmit and receive data under a control of the processor, and the transceiver 720 may be a plurality of elements, i.e., include a transmitter and a receiver, and units for communicating with various other apparatuses on transmission media. The transmission media include a wireless channel, a wired channel, an optic cable and other transmission media.

The processor 730 is configured to read the computer program stored in the memory and perform corresponding operations. The processor 730 may be a central processing unit (CPU), an application specific integrated circuit (ASIC), a field-programmable gate array (FPGA) or a complex programmable logic device (CPLD). The processor 130 may also adopt a multi-core architecture.

In embodiments of the disclosure, the processor 730 reads the computer program stored in the memory and performs operations of:

determining a transmit power required by a PUCCH, and determining a number of PRBs occupied by the PUCCH in a frequency domain according to the transmit power required by the PUCCH and maximum transmit power limit information of resource blocks; or determining a number of PRBs occupied by the PUCCH in a frequency domain according to PRB information in response to receiving the PRB information sent by a UE; and configuring a transmit resource location of the PUCCH for the UE according to the number of PRBs occupied by the PUCCH in the frequency domain.

In some embodiments of the disclosure, determining the transmit power required by the PUCCH includes:

acquiring information related to calculating the transmit power, sent by the UE; and determining the transmit power required by the PUCCH according to the information sent by the UE.

The information sent by the UE includes any one of:

an option in an uplink path loss set pre-configured by a high layer signaling;

an option in an uplink path loss set pre-configured by a high layer signaling;

an option in a transmit power set pre-configured by the high layer signaling for the PUCCH; or an option in a power difference set pre-configured by the high layer signaling, in which the power difference is a difference between the transmit power of the PUCCH and a maximum transmit power of the PUCCH; or an uplink path loss determined according to a PH report in an SRS, in which the SRS is configured by the network side device for the UE on a transmit broadband of the PUCCH. As an example, "pre-configured" in the embodiment may be configured by a high layer signaling.

In some embodiments of the disclosure, determining the transmit power required by the PUCCH according to the information sent by UE includes:

determining the transmit power required by the PUCCH according to an uplink path loss sent by the UE and a target power of the PUCCH;

determining a transmit power of the PUCCH, sent by the UE as the transmit power required by the PUCCH; or determining the transmit power required by the PUCCH according to a power difference, sent by the UE, and the maximum transmit power of the PUCCH.

In addition, determining the number of PRBs occupied by the PUCCH in the frequency domain according to the transmit power required by the PUCCH and the maximum transmit power limit information of resource blocks includes:

comparing the transmit power required by the PUCCH with a maximum transmit power of the PUCCH;

in response to the transmit power required by the PUCCH being less than the maximum transmit power of the PUCCH, calculating the number of PRBs occupied by the PUCCH in the frequency domain according to the transmit power required by the PUCCH and the maximum transmit power limit information of resource blocks; and in response to the transmit power required by the PUCCH being greater than or equal to the maximum transmit power of the PUCCH, determining a maximum number of PRBs occupied by the PUCCH in the frequency domain as the number of PRBs occupied by the PUCCH in the frequency domain.

In embodiments of the disclosure, the maximum number of PRBs occupied by the PUCCH in the frequency domain is determined by:

determining the maximum number of PRBs occupied by the PUCCH in the frequency domain according to preset configuration information of an EIRP, a PSD and an SCS for a current unlicensed spectrum;

determining the maximum number of PRBs occupied by the PUCCH in the frequency domain according to an EIRP limit of the UE and configuration information of a PSD and an SCS for a current unlicensed spectrum; or calculating a first intermediate value of the number of PRBs occupied by the PUCCH in the frequency domain according to configuration information of an EIRP, a PSD and an SCS for a current unlicensed spectrum, and calculating a second intermediate value of the number of PRBs occupied by the PUCCH in the frequency domain according to an EIRP limit of the UE and configuration information of a PSD and an SCS for a current unlicensed spectrum, and determining a minimum value between the first intermediate value and the second intermediate value as the maximum number of PRBs occupied by the PUCCH in the frequency domain.

In some embodiments of the disclosure, determining the number of PRBs occupied by the PUCCH in the frequency domain according to the transmit power required by the PUCCH and the maximum transmit power limit information of resource blocks includes:

determining a plurality of preset power threshold values for the PUCCH, and a plurality of threshold values for the number of PRBs, corresponding to the plurality of power threshold values;

determining the number of PRBs occupied by the PUCCH in the frequency domain from the plurality of threshold values according to a comparison result between the transmit power required by the PUCCH and each of the plurality of power threshold values; and in response to the transmit power required by the PUCCH being greater than or equal to a maximum value among the plurality of power threshold values, determining a maximum number of PRBs occupied by the PUCCH in the frequency domain according to the maximum transmit power limit information of resource blocks, and determining the maximum number of PRBs occupied by the PUCCH in the frequency domain as the number of PRBs occupied by the PUCCH in the frequency domain.

In some embodiments of the disclosure, the PRB information sent by the UE includes any one of:

a number of PRBs occupied by the PUCCH in the frequency domain, calculated by the UE according to the transmit power required by the PUCCH and the maximum transmit power limit information of resource blocks;

an index value of a number of available PRBs, sent by the UE according to the number of PRBs occupied by the PUCCH in the frequency domain; or a parameter value for a number of PRBs, sent by the UE according to the number of PRBs occupied by the PUCCH in the frequency domain.

In embodiments of the disclosure, determining the number of PRBs occupied by the PUCCH in the frequency domain according to the PUCCH information includes:

determining the number of PRBs sent by the UE as the number of PRBs occupied by the PUCCH in the frequency domain;

determining the number of PRBs occupied by the PUCCH in the frequency domain according to the index value of the number of available PRBs, sent by the UE, and a preset PRB number available set of a high layer signaling; or determining the number of PRBs occupied by the PUCCH in the frequency domain according to the parameter value for the number of PRBs, sent by the UE, and a calculation formula of the number of PRBs, preset by a high layer signaling.

In addition, in embodiments of the disclosure, configuring the transmit resource location of the PUCCH for the UE according to the number of PRBs occupied by the PUCCH in the frequency domain includes:

in response to transmitting DCI for uplink scheduling to the UE, adding a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

In some embodiments of the disclosure, in an initial access process of UE, the processor further performs operations of:

indicating the number of PRBs occupied by the PUCCH in the frequency domain in a broadcast system information block SIB1, and determining the transmit resource location of the PUCCH via a PRI in DCI for uplink scheduling;

adding a PRB number indication field via DCI of a message MSG4 to indicate the number of PRBs occupied by the PUCCH in the frequency domain, and adding a PUCCH resource index field in DCI for uplink scheduling to indicate the UE to determine the transmit resource location of the PUCCH according to the number of PRBs occupied by the PUCCH in the frequency domain and a PUCCH resource index value;

indicating related parameters for determining the number of PRBs occupied by the PUCCH in the frequency domain in a broadcast system information block SIB1, indicating a PUCCH resource index via a 3-bit field resource indication value $\Delta_{PRI}$ of DCI for uplink scheduling and a CCE number, and indicating the number of PRBs occupied by the PUCCH in the frequency domain via the PUCCH resource index and the related parameters; or acquiring related parameters for determining the number of PRBs occupied by the PUCCH in the frequency domain in a message Msg3 sent by the UE, indicating a PUCCH resource index via a 3-bit field resource indication value $\Delta_{PRI}$ of DCI for uplink scheduling and a CCE number, and indicating the number of PRBs occupied by the PUCCH in the frequency domain via the PUCCH resource index and the related parameters.

It should be noted that, the network side device involved in embodiments of the disclosure may be a base station. The base station may include a plurality of cells that provide services for terminals. According to different specific application occasions, the base station may also be referred to as an access point, or may be a device in an access network that communicates with a wireless terminal device via one or more sectors on an air interface in the access network, or other names. The network side device may be configured to exchange a received air frame with an Internet Protocol (IP) packet as a router between a wireless UE and a remainder of an access network. The remainder of the access network may include an IP communication network. The network side device may further coordinate attribute management of the air interface. For example, the network side device involved in embodiments of the disclosure may be a base transceiver station (BTS) in a global system for mobile communications (GSM) or code division multiple access (CDMA), or may be a network device (NodeB) in wideband code division multiple access (WCDMA), or may be an evolutional Node B (eNB or e-NodeB) in a long term evolution (LTE) system, or may be a 5G base station (gNB) in a next generation system, or may be a home evolved Node B (HeNB), a relay node, a femto, and a pico, which is not limited in embodiments of the disclosure. In some network structures, the network device may include a centralized unit (CU) node and a distributed unit (DU) node that may also be geographically separated.

According to the network side device in embodiments of the disclosure, the number of PRBs occupied by the PUCCH in the frequency domain is determined according to the transmit power required by the PUCCH and the maximum transmit power limit information of resource blocks or according to the received PRB information sent by the UE, so that the transmit resource location of the PUCCH may be configured for the UE, which not only solves the problem that the coverage range of the PUCCH is affected due to the limited transmit power of a single PRB for the unlicensed spectrum, but also adjusts the number of PRBs actually occupied by the PUCCH so that the PUCCH may not occupy too many resource blocks all the time, thereby improving the spectrum utilization rate of the system.

In order to implement the above embodiments, an apparatus for configuring a resource for an uplink control channel is further provided in the disclosure.

FIG. 8 is a block diagram illustrating a structure of an apparatus for configuring a resource for an uplink control channel in embodiments of the disclosure. As illustrated in FIG. 8, the apparatus for configuring a resource for an uplink control channel includes a first determining unit 801, a second determining unit 802 and a configuration unit 803.

The first determining unit 801 is configured to determine a transmit power required by a PUCCH, and determine a number of PRBs occupied by the PUCCH in a frequency domain according to the transmit power required by the PUCCH and maximum transmit power limit information of resource blocks.

Or the second determining unit 802 is configured to determine a number of PRBs occupied by the PUCCH in a frequency domain according to PRB information in response to receiving the PRB information sent by a UE.

The configuration unit 803 is configured to configure a transmit resource location of the PUCCH for the UE according to the number of PRBs occupied by the PUCCH in the frequency domain.

In some embodiments of the disclosure, the first determining unit 801 is specifically configured to:
acquire information related to calculating the transmit power, sent by the UE; and
determine the transmit power required by the PUCCH according to the information sent by the UE.
The information sent by UE includes any one of:
a pre-configured uplink path loss;
a pre-configured PUCCH transmit power;
a pre-configured power difference, in which the power difference is a difference between the transmit power of the PUCCH and a maximum transmit power of the PUCCH; or
an uplink path loss determined according to a PH report in an SRS, in which the SRS is configured by the network side device for the UE on a transmit broadband of the PUCCH.
As an example, "pre-configured" in the embodiment may be configured by a high layer signaling.

In embodiments of the disclosure, the first determining unit 801 is further configured to:
In embodiments of the disclosure, the first determining unit is further configured to:
determine the transmit power required by the PUCCH according to an uplink path loss sent by the UE and a target power of the PUCCH;
determine a transmit power of the PUCCH, sent by the UE as the transmit power required by the PUCCH; or
determine the transmit power required by the PUCCH according to a power difference, sent by the UE, and the maximum transmit power of the PUCCH.

In some embodiments of the disclosure, the first determining unit 801 is further configured to:
compare the transmit power required by the PUCCH with a maximum transmit power of the PUCCH;
in response to the transmit power required by the PUCCH being less than the maximum transmit power of the PUCCH, calculate the number of PRBs occupied by the PUCCH in the frequency domain according to the transmit power required by the PUCCH and the maximum transmit power limit information of resource blocks; and
in response to the transmit power required by the PUCCH being greater than or equal to the maximum transmit power of the PUCCH, determine a maximum number of PRBs occupied by the PUCCH in the frequency domain as the number of PRBs occupied by the PUCCH in the frequency domain.

In some embodiments of the disclosure, the first determining unit 801 is further configured to:
determine the maximum number of PRBs occupied by the PUCCH in the frequency domain according to preset configuration information of an EIRP, a PSD and an SCS for a current unlicensed spectrum;
determine the maximum number of PRBs occupied by the PUCCH in the frequency domain according to an EIRP limit of the UE and configuration information of a PSD and an SCS for a current unlicensed spectrum; or
calculate a first intermediate value of the number of PRBs occupied by the PUCCH in the frequency domain according to configuration information of an EIRP, a PSD and an SCS for a current unlicensed spectrum, and calculate a second intermediate value of the number of PRBs occupied by the PUCCH in the frequency domain according to an EIRP limit of the UE and configuration information of a PSD and an SCS for a current unlicensed spectrum, and determine a minimum value between the first intermediate value and the second intermediate value as the maximum number of PRBs occupied by the PUCCH in the frequency domain.

In some embodiments of the disclosure, the first determining unit 801 is further configured to:
determine a plurality of preset power threshold values for the PUCCH, and a plurality of threshold values for the number of PRBs, corresponding to the plurality of power threshold values;
determine the number of PRBs occupied by the PUCCH in the frequency domain from the plurality of threshold values according to a comparison result between the transmit power required by the PUCCH and each of the plurality of power threshold values; and
in response to the transmit power required by the PUCCH being greater than or equal to a maximum value among the plurality of power threshold values, determine a maximum number of PRBs occupied by the PUCCH in the frequency domain according to the maximum transmit power limit information of resource blocks, and determine the maximum number of PRBs occupied by the PUCCH in the frequency domain as the number of PRBs occupied by the PUCCH in the frequency domain.

In embodiments of the disclosure, the second determining unit 802, in response to receiving the PRB information sent by the UE, the PRB information sent by the UE includes any one of:

a number of PRBs occupied by the PUCCH in the frequency domain, calculated by the UE according to the transmit power required by the PUCCH and the maximum transmit power limit information of resource blocks;

an index value of a number of available PRBs, sent by the UE according to the number of PRBs occupied by the PUCCH in the frequency domain; or a parameter value for a number of PRBs, sent by the UE according to the number of PRBs occupied by the PUCCH in the frequency domain.

In embodiments of the disclosure, the second determining unit 802 is specifically configured to:

determine the number of PRBs sent by the UE as the number of PRBs occupied by the PUCCH in the frequency domain;

determine the number of PRBs occupied by the PUCCH in the frequency domain according to the index value of the number of available PRBs, sent by the UE, and a preset PRB number available set of a high layer signaling; or determine the number of PRBs occupied by the PUCCH in the frequency domain according to the parameter value for the number of PRBs, sent by the UE, and a calculation formula of the number of PRBs, preset by a high layer signaling.

In embodiments of the disclosure, the configuration unit 803 is specifically configured to:

in response to transmitting DCI for uplink scheduling to the UE, add a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

It should be noted that, the apparatus provided in embodiments of the disclosure may implement all method steps achieved by the method embodiments, and may achieve the same technical effect, and the same part as the method embodiments and the beneficial effect are not repeated in embodiments of the disclosure.

In order to implement the above embodiments, another apparatus for configuring a resource for an uplink control channel is further provided in the disclosure.

FIG. 9 is a block diagram illustrating a structure of another apparatus for configuring a resource for an uplink control channel in embodiments of the disclosure. As illustrated in FIG. 9, the apparatus for configuring a resource for an uplink control channel includes a third determining unit 904.

The third determining unit 904 is in response to in an initial access process of the UE. The third determining unit 904 is specifically configured to:

indicate the number of PRBs occupied by the PUCCH in the frequency domain in a broadcast system information tion block SIB1, and determine the transmit resource location of the PUCCH via a PRI in DCI for uplink scheduling;

add a PRB number indication field via DCI of a message MSG4 to indicate the number of PRBs occupied by the PUCCH in the frequency domain, and add a PUCCH resource index field in DCI for uplink scheduling to indicate the UE to determine the transmit resource location of the PUCCH according to the number of PRBs occupied by the PUCCH in the frequency domain and a PUCCH resource index value;

indicate related parameters for determining the number of PRBs occupied by the PUCCH in the frequency domain in a broadcast system information block SIB1, indicate a PUCCH resource index via a 3-bit field resource indication value $\Delta_{PRI}$ of DCI for uplink scheduling and a CCE number, and indicate the number of PRBs occupied by the PUCCH in the frequency domain via the PUCCH resource index and the related parameters; or acquire related parameters for determining the number of PRBs occupied by the PUCCH in the frequency domain in a message Msg3 sent by the UE, indicate a PUCCH resource index via a 3-bit field resource indication value $\Delta_{PRI}$ of DCI for uplink scheduling and a CCE number, and indicate the number of PRBs occupied by the PUCCH in the frequency domain via the PUCCH resource index and the related parameters.

It should be noted that, in embodiments of the disclosure, 901 to 903 in FIG. 9 have the same function and structure with 801 to 803 in FIG. 8, which will not be repeated herein.

It should be noted that, the division of units in embodiments of the disclosure is illustrative, and only a logical function division. There may be another division manner in the actual implementation. In addition, functional units in embodiments of the disclosure may be integrated in a processing unit, or may be physically existed separately, or two or more units may be integrated in one unit. The above integrated unit may be implemented in the form of a hardware or in the form of a software functional unit.

The integrated unit may be stored in a processor readable storage medium if it is implemented in the form of the software function unit and sold and used as an independent product. On the basis of such an understanding, a part essentially contributing to the related art in the technical solution of the disclosure, or all or part of the technical solution, may be embodied in the form of software product. The computer software product is stored in a storage medium, including several instructions so that a computer device (which may be a personal computer, a server or a network device) is caused to perform all or part of steps in each embodiment method of the disclosure. The forgoing storage medium includes a USB disk, a mobile hard disk, a read-only memory (ROM), a random access memory (RAM), a magnetic disk or an optical disk and other media that may store program codes.

It should be noted that, the apparatus provided in embodiments of the disclosure may implement all method steps achieved by the method embodiments, and may achieve the same technical effect, and the same part as the method embodiments and the beneficial effect are not repeated in embodiments of the disclosure.

A processor-readable storage medium is further provided according to embodiments of the disclosure. The processor-readable storage medium may be any available medium or data storage device that the processor may access, including but not limited to a magnetic memory (e.g., a floppy disk, a hard disk, a magnetic tape, a magnetic optical disk (MO)), an optical memory (e.g., a CD, a DVD, a BD, a HVD), and a semiconductor memory (e.g., a ROM, an EPROM, an EEPROM, a non-volatile memory (a NAND a FLASH), a solid state drive (SSD)).

In embodiments of the disclosure, the processor-readable storage medium is stored with a computer program, and a program instruction/unit corresponding to the method for configuring a resource for an uplink control channel in embodiments of the disclosure (such as a first determining unit 801 or a second determining unit 802, a configuration unit 803 in FIG. 8). When the computer program is executed by a processor, the above method for configuring a resource for an uplink control channel is implemented.

Those skilled in the art shall understand that embodiments in the disclosure may be provided as methods, systems, or computer program products. Therefore, the disclosure may adopt the form of a full hardware embodiment, a full software embodiment, or an embodiment combining a software and a hardware. Further, the disclosure may adopt a form of a computer program product implemented on one or more computer usable storage media (including but not limited to a disk memory and an optical memory) including a computer usable program code.

The disclosure is described with reference to flowcharts and/or block diagrams of methods, devices (systems), and computer program products according to embodiments of the disclosure. It should be understood that each process and/or block in the flowchart and/or the block diagram, and a combination of the process and/or the box in the flowchart and/or the block diagram, may be implemented by computer-executable instructions. The computer-executable instructions may be provided to a processor of a general-purpose computer, a dedicated computer, an embedded processor or other programmable data processing devices to produce a machine such that instructions executed by the processor of the computer or other programmable data processing devices may produce an apparatus for implementing functions specified in one or more processes of the flowchart and/or in one or more boxes of the block diagram.

The processor executable instructions may also be stored in a processor readable memory capable of guiding the computer or the other programmable data processing devices to operate in a particular manner such that the instructions stored in the processor readable memory produce an article of manufacture including an instruction apparatus that implements the function specified in one or more processes of the flowchart and/or in one or more boxes of the block diagram.

The processor executable instructions may also be loaded onto a computer or other programmable data processing devices such that a series of operation steps are performed on the computer or the other programmable devices to produce processings implemented by the computer such that the instructions executed on the computer or the other programmable devices provide steps of functions specified in one or more processes of the flowchart and/or in one or more boxes of the block diagram.

Obviously, those skilled in the art may make various modifications and variations to the disclosure without deviating from the spirit and scope of the disclosure. Thus, if these modifications and variations of the disclosure fall within the scope of claims of the disclosure and their equivalents, the disclosure is also intended to include such modifications and variations.

What is claimed is:

1. A method for configuring a resource for an uplink control channel, performed by a network side device, comprising:

determining a transmit power required by a physical uplink control channel (PUCCH), and determining a number of physical resource blocks (PRBs) occupied by the PUCCH in a frequency domain according to the transmit power required by the PUCCH and maximum transmit power limit information of resource blocks; or determining a number of PRBs occupied by the PUCCH in a frequency domain according to PRB information in response to receiving the PRB information sent by a user equipment (UE); and configuring a transmit resource location of the PUCCH for the UE according to the number of PRBs occupied by the PUCCH in the frequency domain;

wherein configuring the transmit resource location of the PUCCH for the UE according to the number of PRBs occupied by the PUCCH in the frequency domain comprises:

in response to transmitting downlink control information (DCI) for uplink scheduling to the UE, adding a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

2. The method according to claim 1, wherein determining the transmit power required by the PUCCH comprises:

acquiring information sent by the UE and related to calculating the transmit power; and determining the transmit power required by the PUCCH according to the information sent by the UE.

3. The method according to claim 2, wherein the information sent by the UE comprises any one of:

an option in a pre-configured uplink path loss set;

an option in a pre-configured transmit power set of the PUCCH;

an option in a pre-configured power difference set, wherein a power difference is a difference between the transmit power of the PUCCH and a maximum transmit power of the PUCCH; or an uplink path loss determined according to a power headroom (PH) report in a sounding reference signal (SRS), wherein the SRS is configured by the network side device for the UE on a transmit broadband of the PUCCH.

4. The method according to claim 3, wherein determining the transmit power required by the PUCCH according to the information sent by the UE comprises:

determining the transmit power required by the PUCCH according to an uplink path loss sent by the UE and a target power of the PUCCH; or determining a transmit power of the PUCCH, sent by the UE, as the transmit power required by the PUCCH; or determining the transmit power required by the PUCCH according to a power difference, sent by the UE, and the maximum transmit power of the PUCCH.

5. The method according to claim 1, wherein determining the number of PRBs occupied by the PUCCH in the frequency domain according to the transmit power required by the PUCCH and the maximum transmit power limit information of resource blocks comprises:

comparing the transmit power required by the PUCCH with a maximum transmit power of the PUCCH;

in response to the transmit power required by the PUCCH being less than the maximum transmit power of the PUCCH, calculating the number of PRBs occupied by the PUCCH in the frequency domain according to the transmit power required by the PUCCH and the maximum transmit power limit information of resource blocks; and in response to the transmit power required by the PUCCH being greater than or equal to the maximum transmit power of the PUCCH, determining a maximum number of PRBs occupied by the PUCCH in the frequency domain as the number of PRBs occupied by the PUCCH in the frequency domain;

wherein the maximum number of PRBs occupied by the PUCCH in the frequency domain is determined by:

determining the maximum number of PRBs occupied by the PUCCH in the frequency domain according to preset configuration information of an effective isotropic radiated power (EIRP), a power spectral density (PSD) and a subcarrier spacing (SCS) for a current unlicensed spectrum; or determining the maximum number of PRBs occupied by the PUCCH in the frequency domain according to an EIRP limit of the UE and configuration information of a PSD and an SCS for a current unlicensed spectrum; or calculating a first intermediate value of the number of PRBs occupied by the PUCCH in the frequency domain according to configuration information of an EIRP, a PSD and an SCS for a current unlicensed spectrum, and calculating a second intermediate value of the number of PRBs occupied by the PUCCH in the frequency domain according to an EIRP limit of the UE and configuration information of a PSD and an SCS for a current unlicensed spectrum, and determining a minimum value between the first intermediate value and the second intermediate value as the maximum number of PRBs occupied by the PUCCH in the frequency domain.

6. The method according to claim 1, wherein determining the number of PRBs occupied by the PUCCH in the frequency domain according to the transmit power required by the PUCCH and the maximum transmit power limit information of resource blocks comprises:

determining a plurality of preset power threshold values for the PUCCH, and a plurality of threshold values for the number of PRBs, corresponding to the plurality of power threshold values;

determining the number of PRBs occupied by the PUCCH in the frequency domain from the plurality of threshold values according to a comparison result between the transmit power required by the PUCCH and each of the plurality of power threshold values; and in response to the transmit power required by the PUCCH being greater than or equal to a maximum value among the plurality of power threshold values, determining a maximum number of PRBs occupied by the PUCCH in the frequency domain according to the maximum transmit power limit information of resource blocks, and determining the maximum number of PRBs occupied by the PUCCH in the frequency domain as the number of PRBs occupied by the PUCCH in the frequency domain.

7. The method according to claim 1, wherein the PRB information sent by the UE comprises any one of:

a number of PRBs occupied by the PUCCH in the frequency domain, calculated by the UE according to the transmit power required by the PUCCH and the maximum transmit power limit information of resource blocks;

an index value of a number of available PRBs, sent by the UE according to the number of PRBs occupied by the PUCCH in the frequency domain; or a parameter value for a number of PRBs, sent by the UE according to the number of PRBs occupied by the PUCCH in the frequency domain.

8. The method according to claim 7, wherein determining the number of PRBs occupied by the PUCCH in the frequency domain according to the PRB information comprises:

determining the number of PRBs sent by the UE as the number of PRBs occupied by the PUCCH in the frequency domain; or determining the number of PRBs occupied by the PUCCH in the frequency domain according to the index value of the number of available PRBs, sent by the UE, and a preset PRB number available set of a high layer signaling; or determining the number of PRBs occupied by the PUCCH in the frequency domain according to the parameter value for the number of PRBs, sent by the UE, and a calculation formula of the number of PRBs, preset by a high layer signaling.

9. The method according to claim 1, wherein determining by the UE the transmit resource location of the PUCCH according to the number of PRBs occupied by the PUCCH in the frequency domain and the PUCCH resource index value comprises:

determining, by the UE, an initial PRB index of a first frequency hopping and an initial PRB index of a second frequency hopping, according to the number of PRBs.

10. The method according to claim 1, wherein in an initial access process of the UE, the method further comprises:

indicating the number of PRBs occupied by the PUCCH in the frequency domain in a broadcast system information block SIB1, and determining the transmit resource location of the PUCCH via a physical resource indication (PRI) in DCI for uplink scheduling; or adding a PRB number indication field via DCI of a message MSG4 to indicate the number of PRBs occupied by the PUCCH in the frequency domain, and adding a PUCCH resource index field in the DCI for uplink scheduling to indicate the UE to determine the transmit resource location of the PUCCH according to the number of PRBs occupied by the PUCCH in the frequency domain and a PUCCH resource index value; or indicating related parameters for determining the number of PRBs occupied by the PUCCH in the frequency domain in a broadcast system information block SIB1, indicating a PUCCH resource index via a 3-bit field resource indication value $\Delta_{PRI}$ of DCI for uplink scheduling and a control channel elements (CCE) number, and indicating the number of PRBs occupied by the PUCCH in the frequency domain via the PUCCH resource index and the related parameters; or adding a common resource index field to a broadcast system information block SIB1 according to a pre-configured common resource index table, to indicate the UE to search the common resource index table according to a common resource index, to determine the number of PRBs occupied by the PUCCH in the frequency domain, wherein different index values in the common resource index table correspond to different numbers of PRBs; or acquiring related parameters for determining the number of PRBs occupied by the PUCCH in the frequency domain in a message Msg3 sent by the UE, indicating a PUCCH resource index via a 3-bit field resource indication value $\Delta_{PRI}$ of DCI for uplink scheduling and a CCE number, and indicating the number of PRBs occupied by the PUCCH in the frequency domain via the PUCCH resource index and the related parameters.

11. A network side device, comprising a memory, a transceiver and a processor; wherein the memory is configured to store a computer program, the transceiver is configured to transmit and receive data under a control of the processor, and the processor is configured to read the computer program in the memory and perform operations of:

determining a transmit power required by a physical uplink control channel (PUCCH), and determining a number of physical resource blocks (PRBs) occupied by the PUCCH in a frequency domain according to the transmit power required by the PUCCH and maximum transmit power limit information of resource blocks; or determining a number of PRBs occupied by the PUCCH in a frequency domain according to PRB information in response to receiving the PRB information sent by a user equipment (UE); and configuring a transmit resource location of the PUCCH for the UE according to the number of PRBs occupied by the PUCCH in the frequency domain;

wherein configuring the transmit resource location of the PUCCH for the UE according to the number of PRBs occupied by the PUCCH in the frequency domain comprises:

in response to transmitting downlink control information (DCI) for uplink scheduling to the UE, adding a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

12. The network side device according to claim 11, wherein determining the transmit power required by the PUCCH comprises:

acquiring information sent by the UE and related to calculating the transmit power; and determining the transmit power required by the PUCCH according to the information sent by the UE.

13. The network side device according to claim 12, wherein the information sent by the UE comprises any one of:

an option in a pre-configured uplink path loss set;

an option in a pre-configured transmit power set of the PUCCH;

an option in a pre-configured power difference set, wherein a power difference is a difference between the transmit power of the PUCCH and a maximum transmit power of the PUCCH; or an uplink path loss determined according to a power headroom (PH) report in a sounding reference signal (SRS), wherein the SRS is configured by the network side device for the UE on a transmit broadband of the PUCCH;

wherein determining the transmit power required by the PUCCH according to the information sent by the UE comprises:

determining the transmit power required by the PUCCH according to an uplink path loss sent by the UE and a target power of the PUCCH; or determining a transmit power of the PUCCH, sent by the UE, as the transmit power required by the PUCCH; or determining the transmit power required by the PUCCH according to a power difference, sent by the UE, and the maximum transmit power of the PUCCH.

14. The network side device according to claim 11, wherein determining the number of PRBs occupied by the PUCCH in the frequency domain according to the transmit power required by the PUCCH and the maximum transmit power limit information of resource blocks comprises:

comparing the transmit power required by the PUCCH with a maximum transmit power of the PUCCH;

in response to the transmit power required by the PUCCH being less than the maximum transmit power of the PUCCH, calculating the number of PRBs occupied by the PUCCH in the frequency domain according to the transmit power required by the PUCCH and the maximum transmit power limit information of resource blocks; and in response to the transmit power required by the PUCCH being greater than or equal to the maximum transmit power of the PUCCH, determining a maximum number of PRBs occupied by the PUCCH in the frequency domain as the number of PRBs occupied by the PUCCH in the frequency domain;

wherein the maximum number of PRBs occupied by the PUCCH in the frequency domain is determined by:

determining the maximum number of PRBs occupied by the PUCCH in the frequency domain according to preset configuration information of an effective isotropic radiated power (EIRP), a power spectral density (PSD) and a subcarrier spacing (SCS) for a current unlicensed spectrum; or determining the maximum number of PRBs occupied by the PUCCH in the frequency domain according to an EIRP limit of the UE and configuration information of a PSD and an SCS for a current unlicensed spectrum; or calculating a first intermediate value of the number of PRBs occupied by the PUCCH in the frequency domain according to configuration information of an EIRP, a PSD and an SCS for a current unlicensed spectrum, and calculating a second intermediate value of the number of PRBs occupied by the PUCCH in the frequency domain according to an EIRP limit of the UE and configuration information of a PSD and an SCS for a current unlicensed spectrum, and determining a minimum value between the first intermediate value and the second intermediate value as the maximum number of PRBs occupied by the PUCCH in the frequency domain.

15. The network side device according to claim 11, wherein determining the number of PRBs occupied by the PUCCH in the frequency domain according to the transmit power required by the PUCCH and the maximum transmit power limit information of resource blocks comprises:

determining a plurality of preset power threshold values for the PUCCH, and a plurality of threshold values for the number of PRBs, corresponding to the plurality of power threshold values;

determining the number of PRBs occupied by the PUCCH in the frequency domain from the plurality of threshold values according to a comparison result between the transmit power required by the PUCCH and each of the plurality of power threshold values; and in response to the transmit power required by the PUCCH being greater than or equal to a maximum value among the plurality of power threshold values, determining a maximum number of PRBs occupied by the PUCCH in the frequency domain according to the maximum transmit power limit information of resource blocks, and determining the maximum number of PRBs occupied by the PUCCH in the frequency domain as the number of PRBs occupied by the PUCCH in the frequency domain.

16. The network side device according to claim 11, wherein the PRB information sent by the UE comprises any one of:

a number of PRBs occupied by the PUCCH in the frequency domain, calculated by the UE according to the transmit power required by the PUCCH and the maximum transmit power limit information of resource blocks;

an index value of a number of available PRBs, sent by the UE according to the number of PRBs occupied by the PUCCH in the frequency domain; or a parameter value for a number of PRBs, sent by the UE according to the number of PRBs occupied by the PUCCH in the frequency domain;

wherein determining the number of PRBs occupied by the PUCCH in the frequency domain according to the PRB information comprises:

determining the number of PRBs sent by the UE as the number of PRBs occupied by the PUCCH in the frequency domain; or determining the number of PRBs occupied by the PUCCH in the frequency domain according to the index value of the number of available PRBs, sent by the UE, and a preset PRB number available set of a high layer signaling; or determining the number of PRBs occupied by the PUCCH in the frequency domain according to the parameter value for the number of PRBs, sent by the UE, and a calculation formula of the number of PRBs, preset by a high layer signaling.

17. The network side device according to claim 11, wherein determining by the UE the transmit resource location of the PUCCH according to the number of PRBs occupied by the PUCCH in the frequency domain and the PUCCH resource index value comprises:

determining, by the UE, an initial PRB index of a first frequency hopping and an initial PRB index of a second frequency hopping, according to the number of PRBs.

18. A non-transitory processor readable storage medium with a computer program stored thereon, wherein the computer program is configured to cause a processor to perform steps of:

determining a transmit power required by a physical uplink control channel (PUCCH), and determining a number of physical resource blocks (PRBs) occupied by the PUCCH in a frequency domain according to the transmit power required by the PUCCH and maximum transmit power limit information of resource blocks; or determining a number of PRBs occupied by the PUCCH in a frequency domain according to PRB information in response to receiving the PRB information sent by a user equipment (UE); and configuring a transmit resource location of the PUCCH for the UE according to the number of PRBs occupied by the PUCCH in the frequency domain;

wherein configuring the transmit resource location of the PUCCH for the UE according to the number of PRBs occupied by the PUCCH in the frequency domain comprises:

in response to transmitting downlink control information (DCI) for uplink scheduling to the UE, adding a PUCCH resource index field in the DCI for uplink scheduling, to indicate the UE to determine the transmit resource location of the PUCCH according to the number of PRBs occupied by the PUCCH in the frequency domain and a PUCCH resource index value, or indicate the UE to determine the transmit resource location of the PUCCH according to a PUCCH resource index value.

* * * * *